(12) United States Patent
Shimizu et al.

(10) Patent No.: US 11,481,025 B2
(45) Date of Patent: Oct. 25, 2022

(54) DISPLAY CONTROL APPARATUS, DISPLAY APPARATUS, AND DISPLAY CONTROL METHOD

(71) Applicant: SONY GROUP CORPORATION, Tokyo (JP)

(72) Inventors: Itaru Shimizu, Tokyo (JP); Yuichi Miyagawa, Tokyo (JP); Takanobu Omata, Tokyo (JP); Kaoru Koike, Tokyo (JP); Hisataka Izawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/293,196

(22) PCT Filed: Nov. 19, 2019

(86) PCT No.: PCT/JP2019/045162
§ 371 (c)(1),
(2) Date: May 12, 2021

(87) PCT Pub. No.: WO2020/105606
PCT Pub. Date: May 28, 2020

(65) Prior Publication Data
US 2022/0011853 A1   Jan. 13, 2022

(30) Foreign Application Priority Data
Nov. 21, 2018 (JP) .............................. JP2018-218085

(51) Int. Cl.
*G06F 3/01* (2006.01)
*G06T 7/70* (2017.01)
(Continued)

(52) U.S. Cl.
CPC ............ *G06F 3/011* (2013.01); *G06F 3/0346* (2013.01); *G06T 7/70* (2017.01); *G06T 15/10* (2013.01)

(58) Field of Classification Search
CPC ........ G06F 3/011; G06F 3/0346; G06F 3/017; G06F 3/0304; G06F 3/0481; G06F 3/0487; G06T 7/70; G06T 15/10; G03H 1/22
See application file for complete search history.

(56) References Cited

U.S. PATENT DOCUMENTS

| 9,685,005 B2* | 6/2017 | Kjallstrom | ............ G06F 3/0346 |
| 2012/0113223 A1* | 5/2012 | Hilliges | .................. G06F 3/011 348/46 |

(Continued)

FOREIGN PATENT DOCUMENTS

| CN | 103365411 A | 10/2013 |
| JP | 2003-085590 A | 3/2003 |

(Continued)

OTHER PUBLICATIONS

International Search Report and Written Opinion of PCT Application No. PCT/JP2019/045162, dated Feb. 18, 2020, 09 pages of ISRWO.

*Primary Examiner* — Rodney Amadiz
(74) *Attorney, Agent, or Firm* — Chip Law Group

(57) ABSTRACT

There is provided a display control apparatus including a control section configured to control an operation on an object in a position corresponding to an operating position recognized on the basis of a relation between multiple operating lines each displayed corresponding to an indicator body. The apparatus allows the object to be operated with as little motion as possible.

13 Claims, 19 Drawing Sheets

(51) Int. Cl.
    *G06F 3/0346*     (2013.01)
    *G06T 15/10*     (2011.01)

(56) References Cited

U.S. PATENT DOCUMENTS

| | | |
|---|---|---|
| 2013/0257720 A1 | 10/2013 | Noda et al. |
| 2015/0062004 A1* | 3/2015 | Rafii ................. G06F 3/011 |
| | | 345/156 |
| 2015/0262004 A1 | 9/2015 | Noda et al. |
| 2016/0188109 A1* | 6/2016 | Wang ................. G06F 3/0418 |
| | | 345/173 |
| 2017/0235372 A1* | 8/2017 | Song ................. G03H 1/024 |
| | | 345/158 |
| 2018/0335925 A1* | 11/2018 | Hsiao ................. G06F 3/013 |
| 2020/0225830 A1* | 7/2020 | Tang ................. G02B 27/0172 |
| 2021/0090341 A1* | 3/2021 | Ravasz ................. G06F 3/0346 |
| 2021/0200323 A1* | 7/2021 | Doganis ................. G06F 30/12 |
| 2021/0263593 A1* | 8/2021 | Lacey ................. G02B 27/017 |

FOREIGN PATENT DOCUMENTS

| | | |
|---|---|---|
| JP | 2005-050120 A | 2/2005 |
| JP | 2012-104107 A | 5/2012 |
| JP | 2012-252627 A | 12/2012 |
| JP | 2013-205983 A | 10/2013 |

* cited by examiner

DISPLAY CONTROL APPARATUS, DISPLAY APPARATUS, AND DISPLAY CONTROL METHOD

CROSS REFERENCE TO RELATED APPLICATIONS

This application is a U.S. National Phase of International Patent Application No. PCT/JP2019/045162 filed on Nov. 19, 2019, which claims priority benefit of Japanese Patent Application No. JP 2018-218085 filed in the Japan Patent Office on Nov. 21, 2018. Each of the above-referenced applications is hereby incorporated herein by reference in its entirety.

TECHNICAL FIELD

The present disclosure relates to a display control apparatus, a display apparatus, a display control method, and a program.

BACKGROUND ART

There are cases where a user indicates an optional point relative to an object in a three-dimensional space and performs operations on the object starting from an optional point. In such cases, it is desired that the operations on the object should be simple and can be performed intuitively by the user.

For example, PTL 1 discloses, as a technology related to such intuitive and simplified operations, how to indicate an optional point relative to an object displayed in a three-dimensional space presented inside a display region. This technology involves displaying, in the display region, a line segment in a manner reflecting the distance between a single indicator body indicating the optional point on one hand and the display region on the other hand so that a user may use an endpoint of the line segment for indicating that optional point.

PTL 2 discloses a technology for indicating optional points relative to an object in a virtual three-dimensional space by displaying line segments in that virtual three-dimensional space. This technology involves using multiple indicator bodies for displaying the line segments and, using the endpoints of these line segments, permitting operations on multiple points of the object in the virtual three-dimensional space. This makes it possible to grasp the object by using the multiple points. Multiple users can also indicate multiple optional points by using multiple indicator bodies.

PTL 3 discloses a technology for using the index finger as an indicator body for displaying an extension of the finger from the fingertip. This technology allows the displayed extension to continuously extend until it comes into contact with an object. This permits presentation of the object desired to be indicated by the user.

PTL 4 discloses a technology for indicating an optional point by allowing a user to bring a fingertip into contact with the display region including a touch panel. According to the technology, when the user keeps the index finger tip in contact with the touch panel, a pointer appears based on a virtual line originating from the contact position. After appearance of the pointer, the contact position is moved or flicked by the thumb to extend or contract the pointer, which allows the user to indicate an optional point in the display region.

CITATION LIST

Patent Literature

[PTL 1]
　JP 2003-85590A
[PTL 2]
　JP 2005-50120A
[PTL 3]
　JP 2012-104107A
[PTL 4]
　JP 2012-252627A

SUMMARY

Technical Problems

However, the technology of PTL 1 or 2 requires placing the endpoint of a line segment to an optional point by substantially moving the indicator body, which can be a hassle. The technology of PTL 3, in operating a length of a line segment upon indication of an optional point, requires making an additional operation to control the line segment length besides performing the operation to indicate the point. Further, the technology of PTL 4 requires carrying out multiple operations such as touching the touch panel and moving an indicating position thereon.

In view of the above circumstances, operations on the object should preferably be performed with as little motion as possible.

Solution to Problems

According to the present disclosure, there is provided a display control apparatus including a control section configured to control an operation on an object in a position corresponding to an operating position recognized on the basis of a relation between multiple operating lines each displayed corresponding to an indicator body.

Also, according to the present disclosure, there is provided a display apparatus for displaying multiple operating lines each displayed corresponding to an indicator body, the operating lines being displayed to let an operating position be recognized on the basis of a relation therebetween, the operating position corresponding to a position in which an object is allowed to be operated.

Also, according to the present disclosure, there is provided a display control method including causing a processor to control an operation on an object in a position corresponding to an operating position recognized on the basis of a relation between multiple operating lines each displayed corresponding to an indicator body.

Also, according to the present disclosure, there is provided a program for causing a computer to function as a control section that controls an operation on an object in a position corresponding to an operating position recognized on the basis of a relation between multiple operating lines each displayed corresponding to an indicator body.

DESCRIPTION OF EMBODIMENT

A preferred embodiment of the present disclosure is described below with reference to the accompanying drawings. Note that, throughout the ensuing description and the drawings, the constituent elements having substantially identical functions and configurations are represented by the same reference signs, and their redundant explanations are not repeated.

Figure 1:
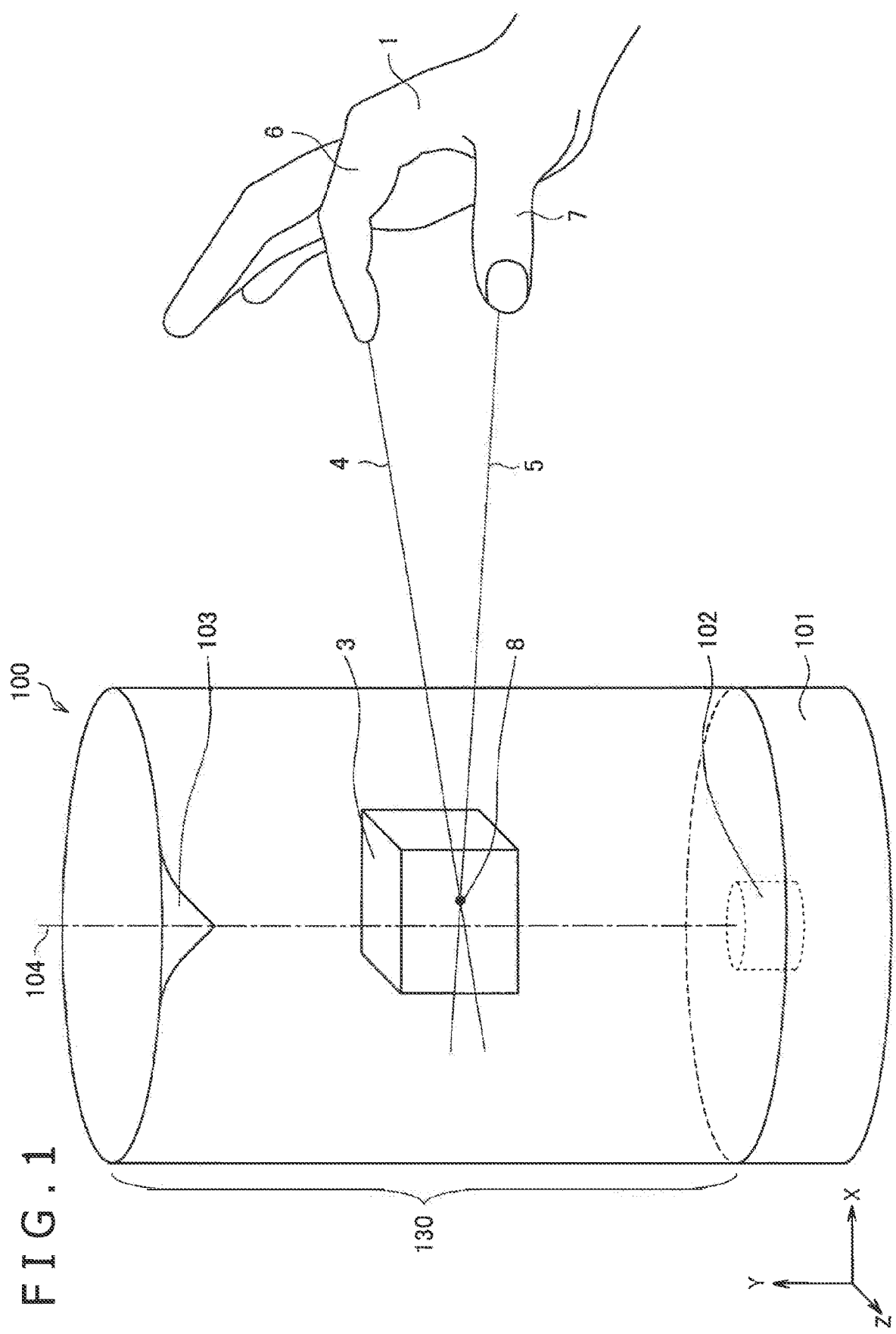
FIG. 1 is a schematic diagram depicting a display control apparatus as one embodiment of the present disclosure.

Note that the description will be given under the following headings:
1. Technical overview and external configuration
2. Embodiment
2.1 Internal configuration
2.2 Display and operation examples
2.3 Operation flow
3. Alternative examples
4. Hardware configuration example 1. Technical Overview and External Configuration Outlined first with reference to FIG. 1 is a display control apparatus 100 that allows an object to be operated with as little motion as possible. FIG. 1 depicts an example of the display control apparatus for operating an object.

The present embodiment is explained on the assumption that the direction of the plane on which the display control apparatus 100 is placed (xz plane) is the horizontal direction and that the direction perpendicular to that plane is the vertical direction (y direction).

FIG. 1 depicts how a cylindrically-shaped display control apparatus 100 (called the display control apparatus 100 hereunder) displays an object 3 in a three-dimensional manner. The display control apparatus 100 may be a desktop-size apparatus approximately 10 to 30 cm in height, for example. As another example, the display control apparatus 100 may be a life-size apparatus approximately 2 m in height and 2 m in diameter.

The display control apparatus 100 has a base 101, an emitting section 102, a display section 130, and a reflecting mirror 103. The base 101 is cylindrically shaped and provided at the underside of the display control apparatus 100. The base 101 holds the emitting section 102, the display section 130, and the reflecting mirror 103 with a suitable holding mechanism, not depicted.

The emitting section 102 is oriented upward at the approximate center of the base 101. The emitting section 102 emits object light for displaying the object 3 along an optical axis 104 extending in the vertical direction (y direction).

The display section 130 provides a cylindrically-shaped transmissive hologram arranged around the entire circumference of the optical axis 104. The transmissive hologram retains, for example, records of interference patterns of light diffused through a diffuser panel and has a function of diffusing incident object light. In the present embodiment, the display section 130 functions as a hologram screen.

The reflecting mirror 103 has a reflecting surface that reflects the object light emitted from the emitting section 102. The reflecting mirror 103 is arranged to face the emitting section 102 in reference to the optical axis 104 in such a manner that the reflecting surface is oriented toward the emitting section 102.

The object light emitted upward from the emitting section 102 is reflected radially from the reflecting surface of the reflecting mirror 103 toward the circumference of the display section 130. This allows a user visually to recognize a three-dimensionally presented object.

Here, a user 1 uses an index finger 6 and a thumb 7 as the indicator bodies to indicate an operating position of the object. According to the technology of the present disclosure, the operating position is an intersection point 8 between an operating line as part of an extended line 4 extending from the index finger 6 on one hand and an operating line as part of an extended line 5 extending from the thumb 7 on the other hand. The object 3 corresponding to the operating position is then controlled to be operated.

In such a manner, the intersection point 8 between multiple operating lines extending from multiple indicator bodies is used as the operating position for operating the object, the operating position being changed in keeping with changes of the intersection point 8. This makes it possible to intuitively operate the object without entailing large movements of the arm or the body of the user 1 as the base body supporting the indicator bodies.

2. Embodiment

Figure 2:
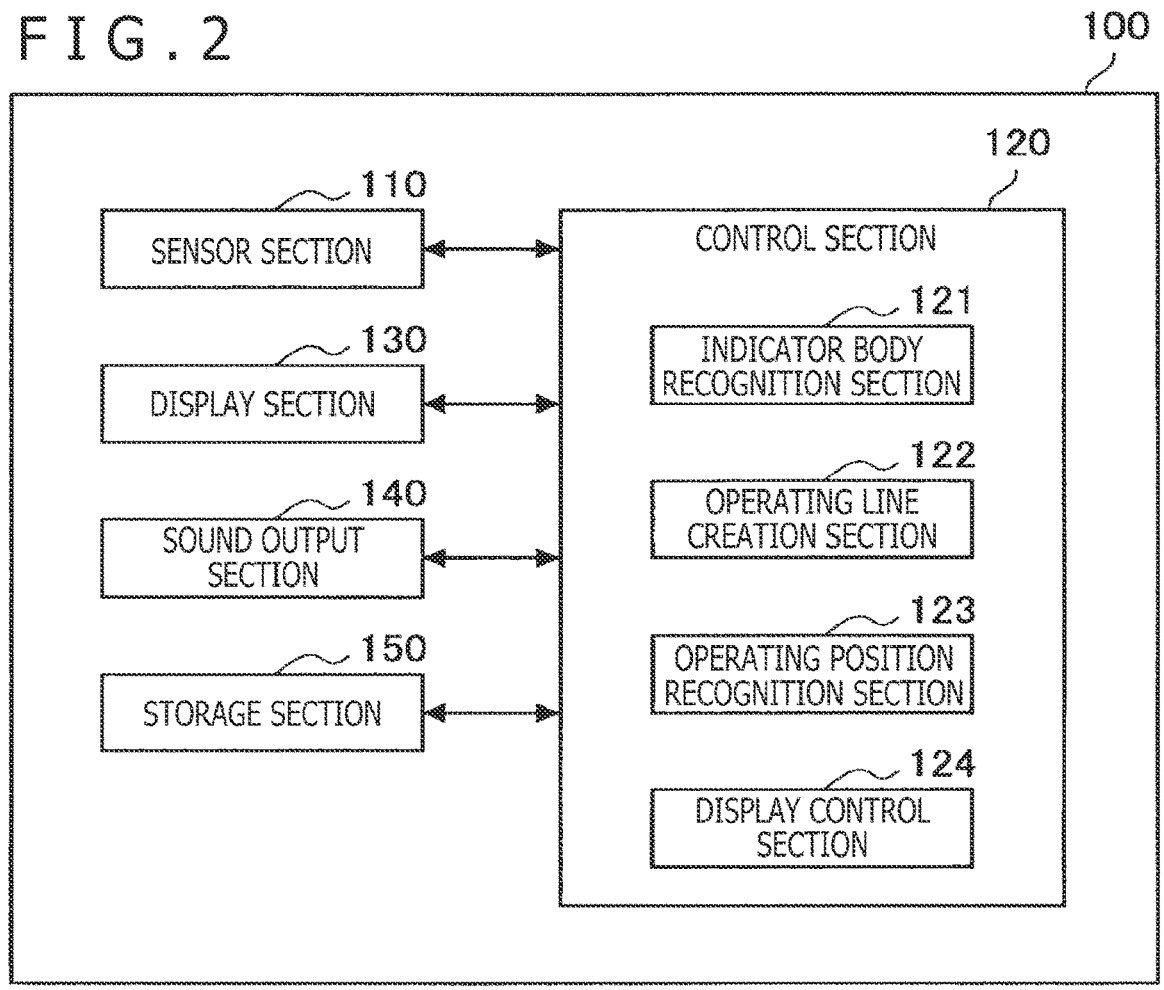
FIG. 2 is a block diagram depicting an internal configuration of the display control apparatus as the embodiment.

An internal configuration example of the display control apparatus 100 is explained below with reference to FIG. 2.
(2.1 Internal Configuration)
The display control apparatus 100 includes a sensor section 110, a control section 120, a display section 130, a sound output section 140, and a storage section 150. In the display control apparatus 100, the control section 120 processes various kinds of information acquired from the sensor section 110 so as to permit operations on the object 3.
(Sensor Section 110)
The sensor section 110 has a function of sensing, for example, the indicator body to acquire various kinds of information and outputting the acquired information to the control section 120. The indicator body is a physical body for indicating the direction of an operating line, to be discussed later, and may be supported by the base body. The indicator body may be a physical body having a certain length such as a finger or an arm, for example. Here, if the indicator body is a finger, then the palm or the arm that supports the finger is the base body.

The sensor section 110 may be an imaging apparatus for capturing images of a space that includes the indicator body. The sensor section 110 may be a stereo camera, for example. The sensor section 110 acquires information regarding the shape or position of the indicator body by processing captured images obtained from the imaging apparatus.

The sensor section 110 is not limited to being the imaging apparatus and may be a distance sensor. By acquiring information regarding the distance from the sensor section 110 to the indicator body, the sensor section 110 can obtain the information regarding the shape or position of the indicator body. For example, the distance sensor may be a ToF (Time Of Flight) sensor that performs recognition based on phase difference.

The sensor section 110 may acquire, as the information regarding the shape or position of the indicator body, the distance or positional relation between the indicator body and a display region. The display region means a range that can provide 3D display of an object. In the case of the display control apparatus 100, the display region refers to a spatial region enclosed by the display section 130. The distance between the measured indicator body and the display region may be used to indicate the length of the operating line, to be created later.

At least one sensor section 110 may be arranged around the display control apparatus 100, such as in the upper or lower part thereof. The sensor section 110 need only acquire the information used for recognizing the indicator body. That means the position where the sensor section 110 is to be arranged is not limited to any position. For example, the sensor section 110 may be positioned far away from the display control apparatus 100. Alternatively, the sensor section 110 may be arranged on the user's finger or arm.
(Control Section 120)
The control section 120 has an indicator body recognition section 121, an operating line creation section 122, an operating position recognition section 123, and a display control section 124. The control section 120 has a function of controlling the display section 130 by processing various kinds of information acquired by the sensor section 110. The control section 120 also has a function of controlling the sound output section 140 and the storage section 150 in addition to controlling the display section 130.
((Indicator Body Recognition Section 121))
The indicator body recognition section 121 recognizes the shape or position of the indicator body as well as an extending direction thereof by using the various kinds of information obtained by the sensor section 110. The indicator body recognition section 121 may recognize, as a position of the indicator body, the position thereof with respect to the display region or the object. By recognizing the shape or position of the indicator body, the indicator body recognition section 121 can recognize an extending direction of the indicator body. The extending direction of the indicator body means the direction indicated by the indicator body.

The indicator body recognition section 121 may recognize a physical body such as a stick having a certain length as the indicator body. Specifically, the indicator body recognition section 121 may recognize the user's arm or finger as the indicator body. The indicator body recognition section 121 may recognize one or multiple indicator bodies.

Figure 3:
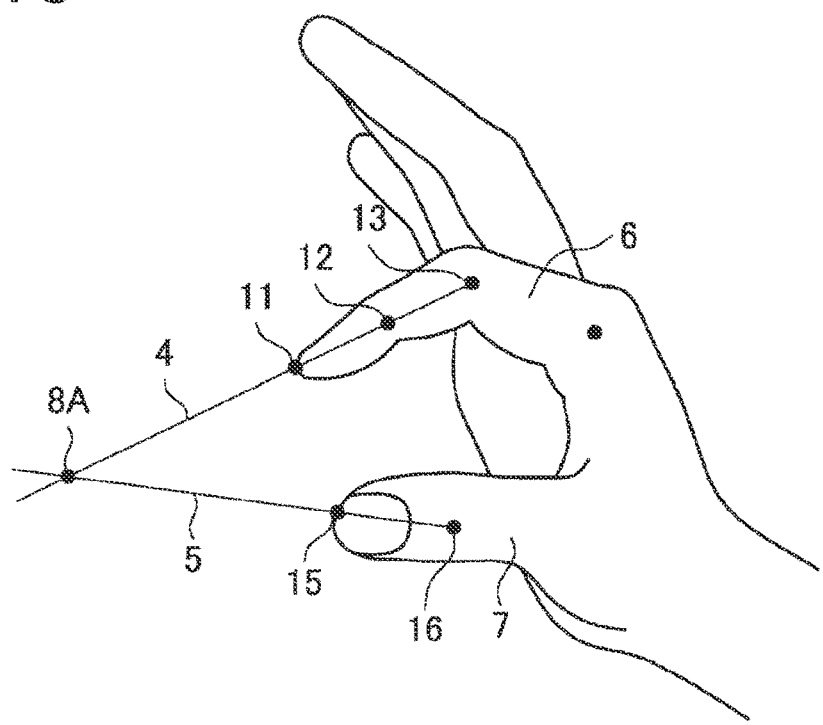
FIG. 3 is a schematic diagram depicting an example of processing performed by a control section of the display control apparatus as the embodiment.

When recognizing an index finger of the user 1 as the indicator body as depicted in FIG. 3, for example, the indicator body recognition section 121 may recognize the shape or position of the indicator body by using a tip 11, a first joint 12, a second joint 13, and a third joint 14 of the index finger. Likewise, the indicator body recognition section 121 may recognize a detailed shape or position of another indicator body by using a tip 15 and a first joint 16 of the thumb. In such a manner, the indicator body recognition section 121 can recognize the shapes or positions of multiple indicator bodies.
((Operating Line Creation Section 122))
The operating line creation section 122 has a function of creating an operating line based on the information regarding the indicator body recognized by the indicator body recognition section 121. The operating line is created on an extended line stretching from the indicator body.

That is, the operating line creation section 122 may create extended lines 4 and 5 in a manner stretching from the fingers of the user 1 as depicted in FIG. 3. Specifically, the operating line creation section 122 may create the extended lines by using the index finger 6 as the indicator body and by use of changing points for changing the direction indicated by the joints of the finger (indicator body), for example. For example, the operating line creation section 122 may create an extended line such that it passes through the fingertip 11, the first joint 12, and the second joint 13 being used. Likewise, the operating line creation section 122 may create the extended line 5 by using the thumb 7 as the indicator body, the extended line 5 being such that it passes through the tip 15 and the first joint 16 of the thumb.

Figure 4:
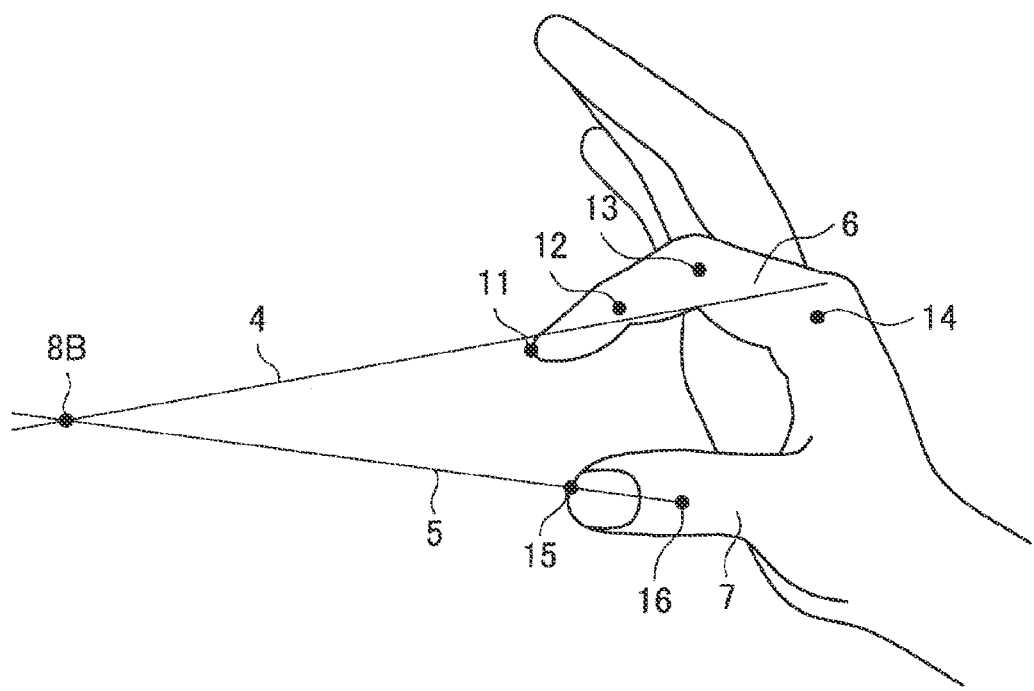
FIG. 4 is a schematic diagram depicting another example of the processing performed by the control section of the display control apparatus as the embodiment.

Alternatively, the operating line creation section 122 may create an extended line by using some of the above-mentioned changing points or create an extended line such that it passes through a mean position of the changing points. In this case, the extended line may be a regression line obtained from the positions of the changing points used in a three-dimensional space. For example, as depicted in FIG. 4, the extended line 4 stretching from the index finger 6 used as the indicator body may be a regression line obtained from three-dimensional coordinates of the tip 11, the first joint 12, the second joint 13, and the third joint 14 of the index finger.

The operating line creation section 122 may create the above-mentioned extended lines as the operating lines. In this case, operability is enhanced because indication is made possible far in the direction of a long-extended line. On the other hand, the operating line creation section 122 may create an operating line as a finite line segment on the extended line. In this case, visibility is improved for the user because the extended line is finite. At this time, the operating line may be such that its start point is the tip of the direction in which the indicator body gives an indication and that the end point of the operating line is used as the operating position, to be discussed later.

The length of a line segment may suitably be determined according to the usage environment. In the case where the line segment is short, highly-accurate operations can be performed closer to the indicator body. On the other hand, in the case where the line segment is long, operations can be performed far away from the indicator body over a wider range. Because the user senses changes in operating sensitivity depending on the length of the line segment, the line segment length may be changed as desired by the user.

Figure 5:
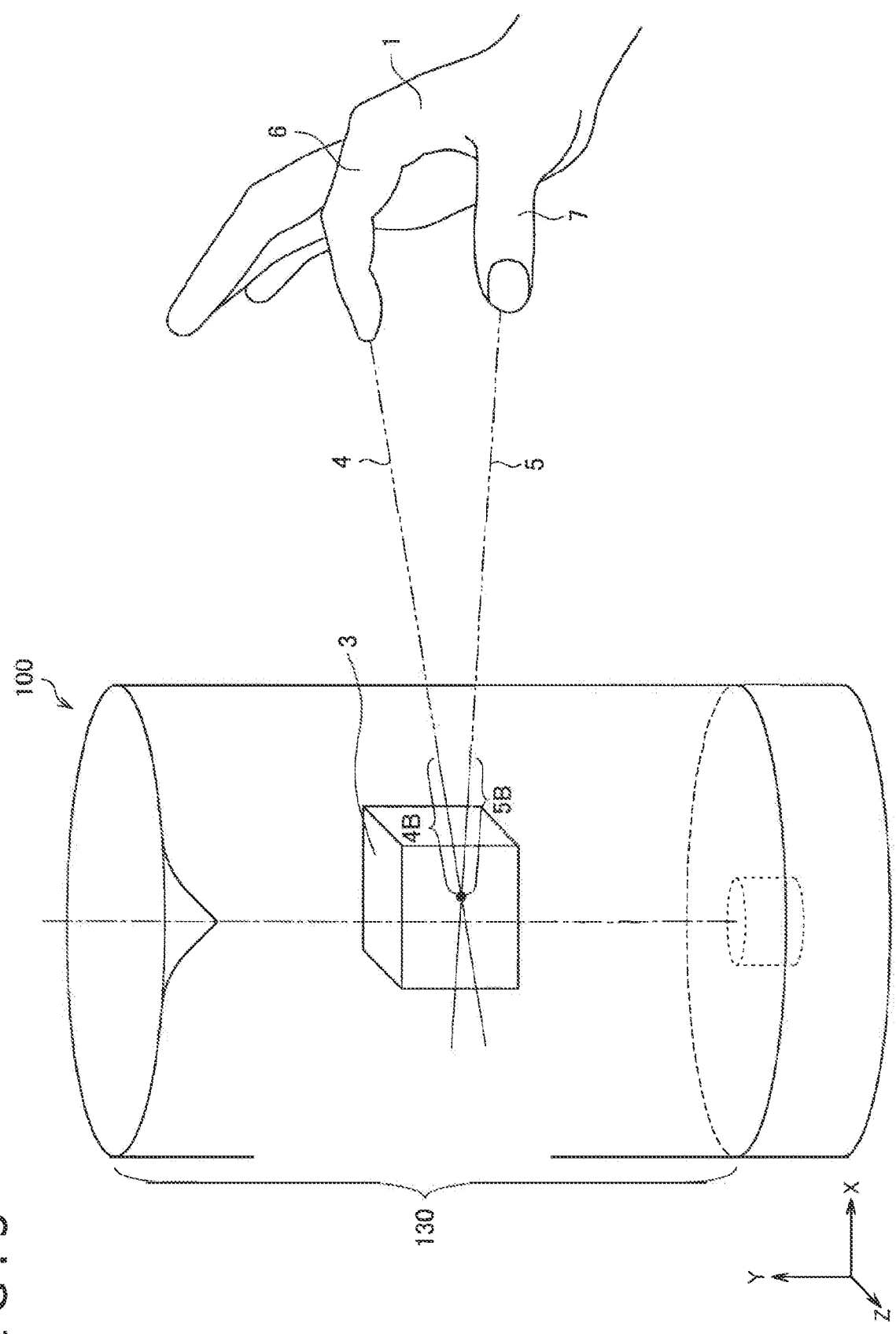
FIG. 5 is a schematic diagram depicting another example of the processing performed by the control section of the display control apparatus as the embodiment.
Figure 6:
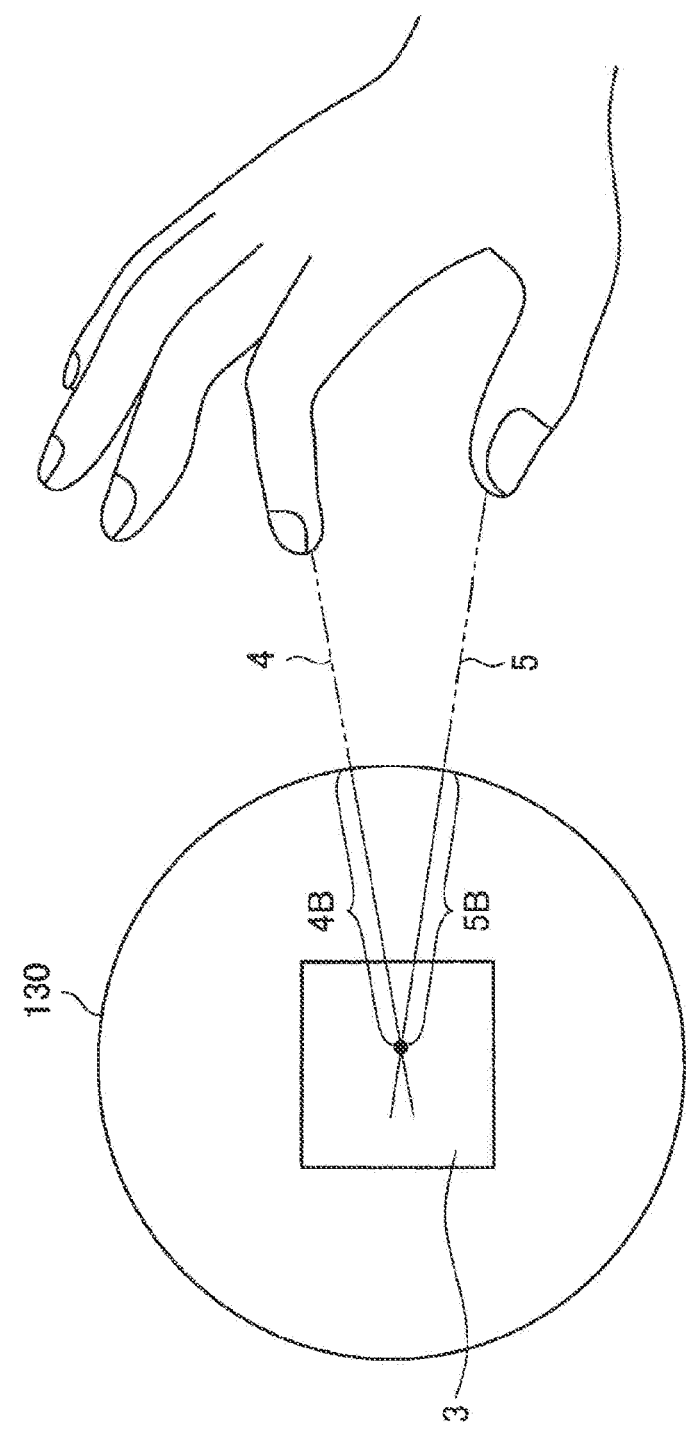
FIG. 6 is a schematic diagram depicting another example of the processing performed by the control section of the display control apparatus as the embodiment.

Described below with reference to FIGS. 5 and 6 is an example of how extended lines and operating lines are displayed. FIGS. 5 and 6 depict how extended lines and operating lines are typically displayed. FIG. 5 illustrates the cylindrically-shaped display control apparatus 100 that displays the object 3 in a three-dimensional manner. The index finger 6 and the thumb 7 of the user 1 serve as the indicator bodies.

The operating line creation section 122 creates the extended lines 4 and 5 stretching from the index finger 6 and the thumb 7 of the user 1 towards the object 3. Here, in a display region where the extended line 4 is enclosed by the display section 130 of the display control apparatus 100, the display control apparatus 100 displays an operating line 4B. Likewise, in a display region where the extended line 5 is enclosed by the display section 130 of the display control apparatus 100, the display control apparatus 100 displays an operating line 5B.

((Operating Position Recognition Section 123))

The operating position recognition section 123 has a function of recognizing an operating position, based on the operating lines created by the operating line creation section 122. The operating position means the position from which an operation on the object is to be originated. The operation on the object is enabled depending on whether or not the operating position recognition section 123 recognizes the operating position.

The operating position recognition section 123 may recognize an intersection point between multiple operating lines as the operating position. This allows the operating position to be changed as desired by changing the inclination of the base body that supports the indicator body or by changing the direction indicated by the indicator body. An optional point in the three-dimensional space can thus be selected as the operating position with as little motion as possible.

Instead of using the intersection point, the operating position recognition section 123 may recognize the operating position by determining whether or not the length of the shortest line segment connecting multiple operating lines is equal to or less than a threshold value. This widens the range in which the intersection point is to be created and facilitates recognition of the operating position.

Figure 7:
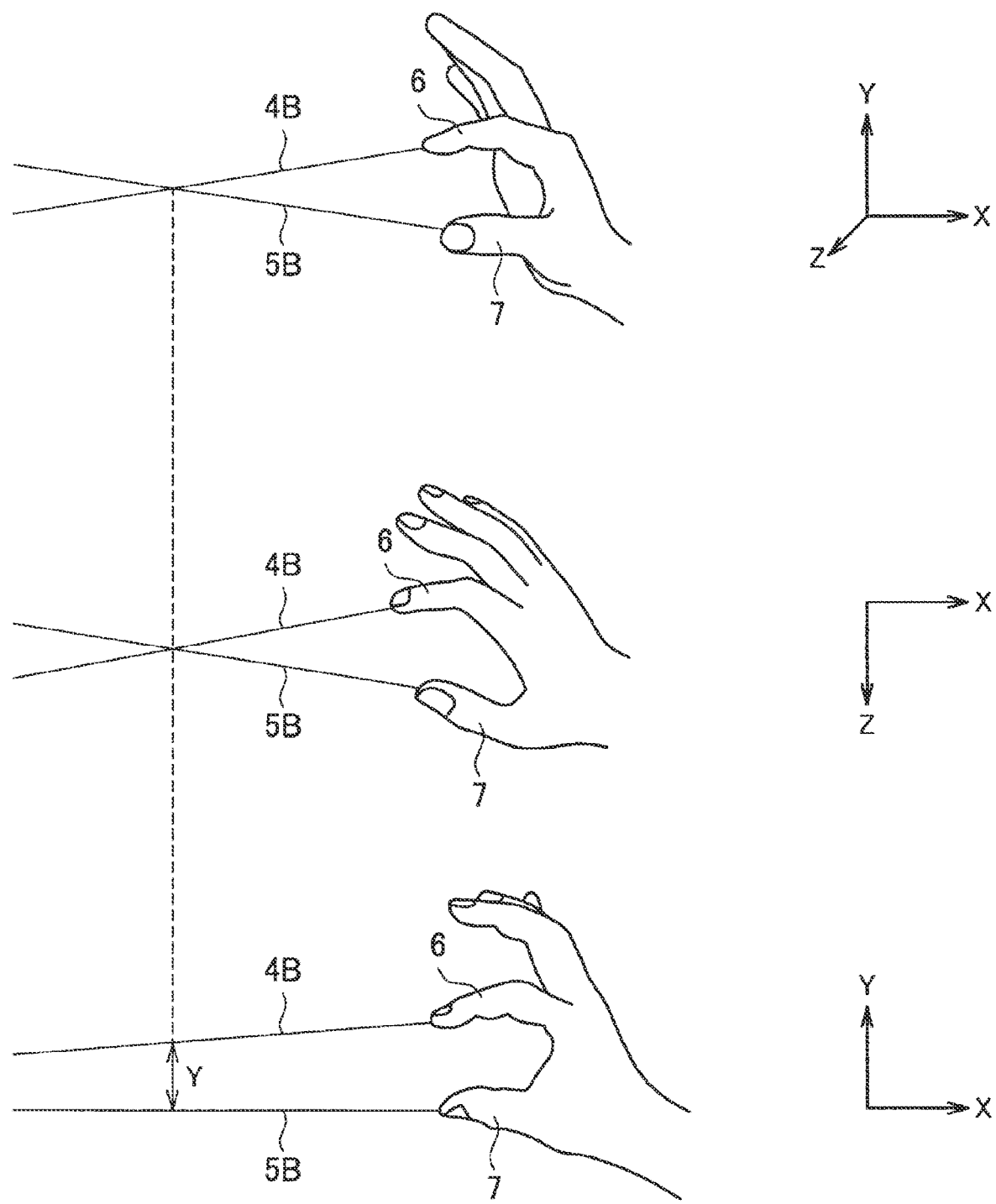
FIG. 7 is a schematic diagram depicting another example of the processing performed by the control section of the display control apparatus as the embodiment.

Below is a specific explanation made with reference to FIG. 7. FIG. 7 is a schematic diagram depicting how to determine whether the length of the shortest line segment is equal to or less than the threshold value. The operating position recognition section 123 recognizes the operating position based on the operating lines 4B and 5B extending from the index finger 6 and thumb 7. When viewed from directly above in the y-axis direction, the operating lines 4B and 5B form an intersection point therebetween. On the other hand, when viewed from the z-axis direction, the operating lines 4B and 5B do not form any intersection point. At this time, the operating position recognition section 123 may recognize the operating position by determining whether or not the shortest distance Y between the operating lines 4B and 5B in the three-dimensional space is equal to or less than a threshold value.

The operating position recognition section 123 may select as the operating position an optional point along the shortest line segment Y in a case of recognizing the operating position in the manner described above by using the threshold value. At this time, the midpoint of the shortest line segment Y may be selected as the operating position, for example. Note that the threshold value may be set as desired by the user.

((Display Control Section 124))

The display control section 124 has functions of presenting the user primarily with operations on the object, controlling the display of operating lines, and changing diverse display mode features. The functions performed by the display control section 124 are explained successively below.

The display control section 124 controls the presentation, to the user, of operations on the object in a position corresponding to the operating position. The object in the position corresponding to the operating position may be an object positioned within a predetermined range of distance from the operating position, such as an object with which the operating position comes into contact or which the operating position enters. The operations on the object include an operation to indicate an optional point inside the object and an operation to move the object starting from an optional point. Note that these operations may be performed not only on the object but also on an optional point in the space. In addition, there may be one or multiple optional points. Given a dynamic object, the display control section 124 may perform operations to halt the object for a predetermined period of time, e.g., a few seconds, upon recognition of the operating position.

The display control section 124 also has a function of controlling display of operating lines. The display control section 124 controls display of the operating lines in such a manner that these lines appear as if they were extensions of the indicator bodies of the user operating the object. In this case, when visually recognized by another user, the operating lines need not be extensions of the indicator bodies of the relevant user. In the case where the displayed operating lines are to be controlled as extensions of the indicator bodies in the above manner, line-of-sight information regarding the user may be used. The line-of-sight information may be obtained by the above-described sensor section 110.

Further, in the case where there are multiple users, the display control section 124 may perform display control such that the operating lines of a user different from the user operating the object appear to extend from the indicator bodies of that different user. Thus, the display of the operating lines by the display control section 124 may be performed for not only the user operating the object but also for other users. Because diverse operating lines exist in the case where those of multiple users are displayed as explained above, the display control section 124 may control whether or not to display an operating line of a given user by determining whether or not the indicator body of that user is at least at a predetermined distance from the display region. In this case, the display control section 124 may display the operating line of each user if the operating line of that user is within the predetermined distance and delete the displayed operating line if the indicator body of that user is at least at the predetermined distance.

The display control section 124 also has a function of performing operations other than the object-related operations, such as changing display mode features of the operating lines or of the operating position. Specifically, upon displaying the operating lines, the display control section 124 may change such display mode features as the color, luminance, transmittance, thickness, shape, dotted-line appearance, and broken-line appearance of the operating lines. The operating lines are each displayed as a line segment that has a predetermined length and thickness. In terms of a motif, for example, the operating lines may be displayed as chopsticks or as tweezers.

Further, the display control section 124 may change the display mode features of the operating position such as its color, an appearance of new display indicative of the operating position, or the surroundings thereof; or the display mode features of the object in a position corresponding to the operating position.

Further, the display control section 124 may change the display mode features not only of the operating lines or of the operating position but also of the object 3 targeted for operation. The display mode features may be changed in a manner timed to coincide with when the object becomes operable following recognition of the operating position. As an example of changing the display mode features, the color or the line shape of a frame border enclosing the object may be changed. Also, a new display feature may be added along the frame border of the object. One such new display feature may be small circular symbols being placed at predetermined intervals along the frame border of the object.

The above-described change of the display mode features may be set or carried out dynamically depending on the target whose display mode features are to be changed or in keeping with the space surrounding the target. The change makes it possible to highlight the region in which the display mode features have been changed against other regions. Further, depending on the circumstances, visibility and operability for the user can be improved when the space in which the object is to be displayed is freed of obstructions, for example.

Further, in the case where multiple users are involved, the display control section 124 may change the display mode features of the operating lines and of the operating position in a manner corresponding to each user. The change improves the manner of distinguishing each specific user to whom given indications are attributed.

(Display Section 130)

The display section 130 has a function of displaying operations on the object, under the control of the control section 120. The display section 130 is configured with an apparatus capable of visually notifying the user of the operating lines created by the control section 120 and of the object targeted for operation.

For example, the display section 130 may be a touch-panel display, a three-dimensional display, a spatial display, or a projection display. Specifically, the display section 130 may be a CRT (Cathode Ray Tube) display, a liquid crystal display, a plasma display, an EL (electroluminescence) display, a laser projector, an LED projector, or lamps.

Depending on the above-mentioned type of display, the display section 130 may display operations on the object either three-dimensionally, or two-dimensionally in a manner enabling the user to view apparently three-dimensional operations on the object (e.g., in a stereoscopic or perspective view). Also, there may be provided multiple display sections 130.

(Sound Output Section 140)

The sound output section 140 has a function of outputting sounds to the user, under the control of the control section 120. For example, upon recognizing the operating position, the sound output section 140 may present a sound instead of display for notifying the user that the operating position is recognized. Further, the sound output section 140 may perform sound output in addition to the display control. An example of the sound output is a sound being output when the operating position comes into contact with the object. Note that, other than sounds, vibrations may be used to notify the user of such contact. As an example of vibration output, vibrations are generated to physically notify the user wearing a ring- or glove-type vibrating device.

(Storage Section 150)

The storage section 150 has a function of storing objects or content. The storage section 150 may store the objects or content supplied from the outside. Also, the storage section 150 may store information such as various parameters for use in the processing performed by the control section 120.

Note that, in the display control apparatus 100 configured as described above, the display control section 124 uses the displayed operating position not only for controlling the operations on the object but also for presenting the user with diverse indications by taking advantage of the operating position. For example, the display control section 124 may allow the operating position to be displayed in the space and to move while being displayed therein. The display control section 124 may further allow multiple operating positions to be displayed.

Further, the display control section 124 may delete a displayed operating position or display a line connecting the operating positions. The display control section 124 may also display the trajectory in which the operating position is moved in the form of a line.

When the operating position display is utilized as described above, it is possible to display the operating position being superposed in a space or on an object in the case where multiple users view the display control apparatus 100. This enables one user to present the other users with his or her intention to perform operations. In another use, the user doing the operations may use the operating position as a marker function.

Further, the display control apparatus 100 configured as described above may not only provide operation control display of the object on the basis of recognition of the operating position but also perform operation control of the object based on voice indication. Also, the display control apparatus 100 may carry out object operation control based on input indications by using other interfaces (e.g., indications given by clicking the mouse with the hand different from the hand being used as the indicator body). As an input indication, line-of-sight input such as blinking of an eye may be performed by the user.

(2.2 Display and Operation Examples)

The foregoing paragraphs have discussed an internal configuration example of the display control apparatus 100. Described below with reference to FIGS. 8 to 14 are examples of how the display control apparatus 100 operates an object by using the above-described internal configuration.

Figure 8:
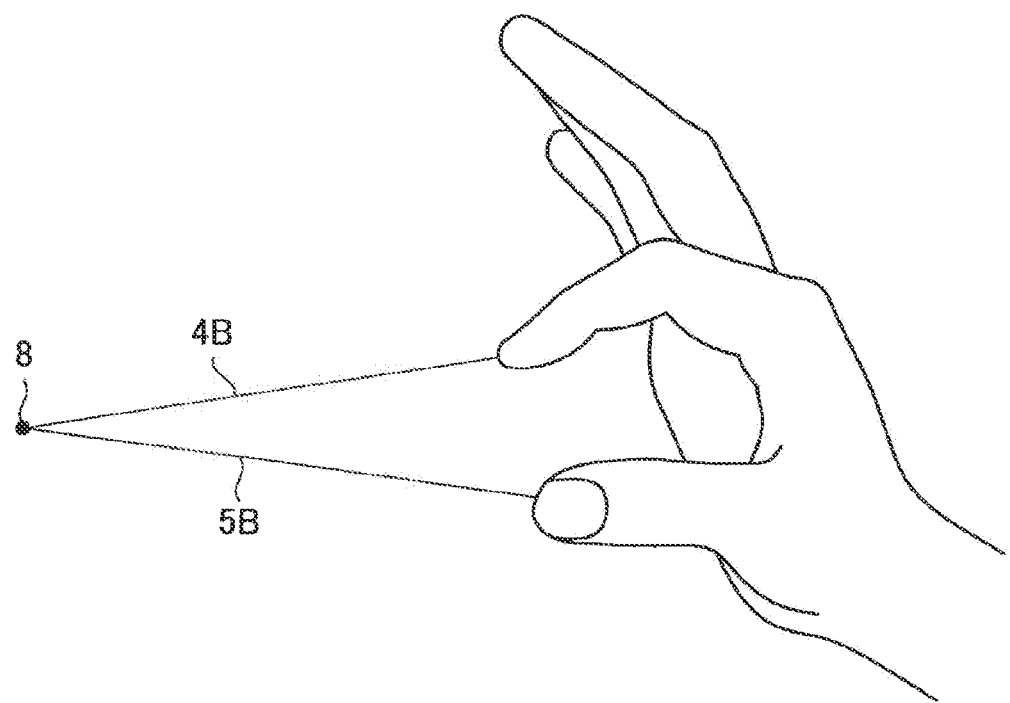
FIG. 8 is a schematic diagram depicting another example of the processing performed by the control section of the display control apparatus as the embodiment.
Figure 9:
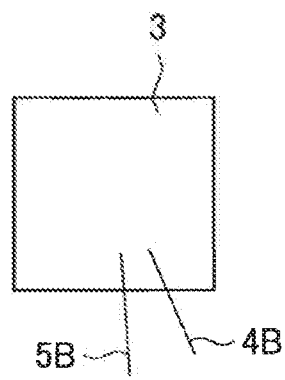
FIG. 9 is a schematic diagram depicting another example of the processing performed by the control section of the display control apparatus as the embodiment.

FIG. 8 depicts an example of how the operating position is recognized, and FIG. 9 illustrates an example of how the operating position is not recognized. FIGS. 10 to 14 depict examples of how operations are performed on the object corresponding to the operating position.

In a description with reference to FIG. 8, the control section 120 recognizes the intersection point 8 between the operating lines 4B and 5B as the operating position. In a description with reference to FIG. 9, on the other hand, where the operating lines 4B and 5B do not intersect with each other, the control section 120 does not recognize the operating position and thus does not control operations on the object 3. Below are examples in which the control section 120 recognizes the operating position and thereby controls operations on the object.

Figure 10:
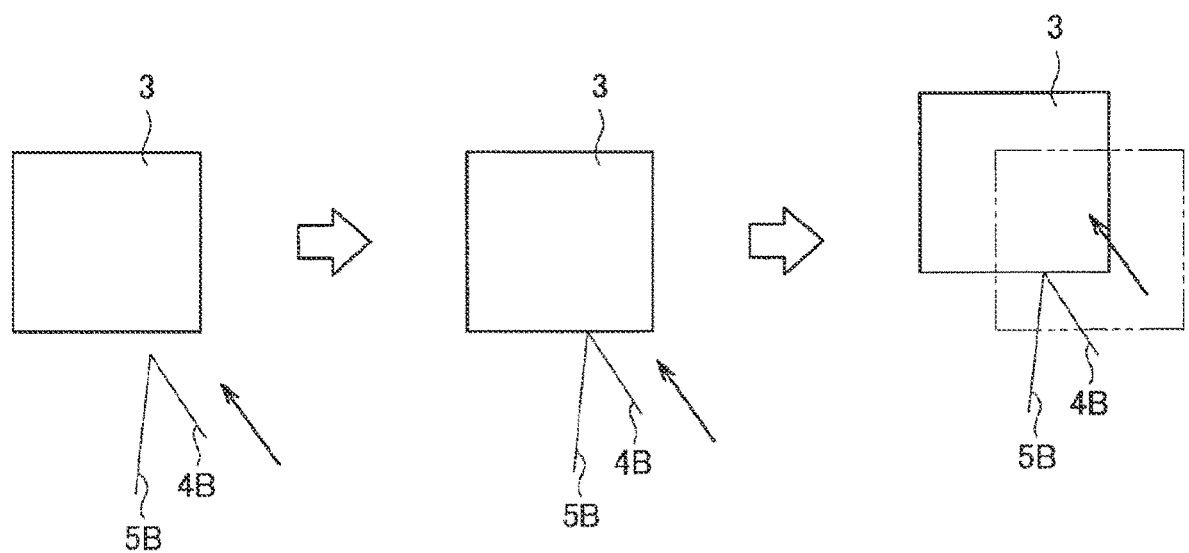
FIG. 10 is a schematic diagram depicting another example of the processing performed by the control section of the display control apparatus as the embodiment.

As depicted in FIG. 10, when the user causes the operating lines 4B and 5B to form an intersection point therebetween outside the object 3, the operating position recognition section 123 of the control section 120 recognizes the operating position. The operating position is outside the object and away therefrom by a predetermined distance. Since the operating position is recognized, the control section 120 permits operations on the object 3 in the position corresponding to the operating position.

Here, with the operating position recognized by the control section 120, the user brings the operating position close to and into contact with the object.

If the user further moves the operating position after it has come into contact with the object, the control section 120 performs operation control to move and push out the position of the object 3 in a direction in which the operating position is moved starting from the point of contact between the operating position and the object.

In such a manner, the display control apparatus 100 performs operation control of the object corresponding to the operating position.

Figure 11:
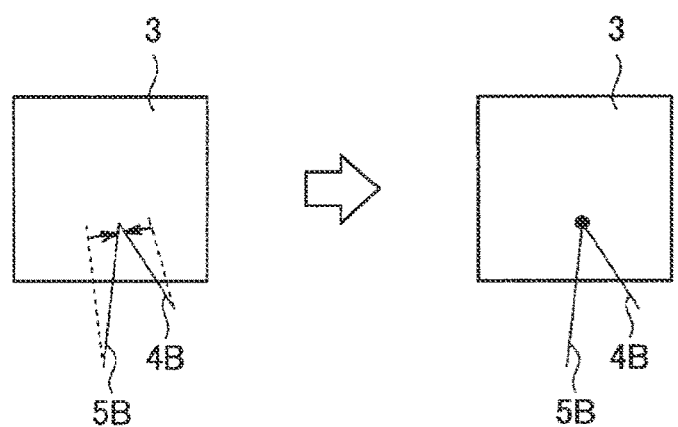
FIG. 11 is a schematic diagram depicting another example of the processing performed by the control section of the display control apparatus as the embodiment.

FIG. 11 depicts an example in which the operating position is recognized inside the object. As depicted in FIG. 11, when the user causes the operating lines 4B and 5B to form an intersection point therebetween in the object 3, the control section 120 recognizes the operating position inside the object 3. At this time, the object may be moved starting from the operating position as when the operating position is moved.

Figure 12:
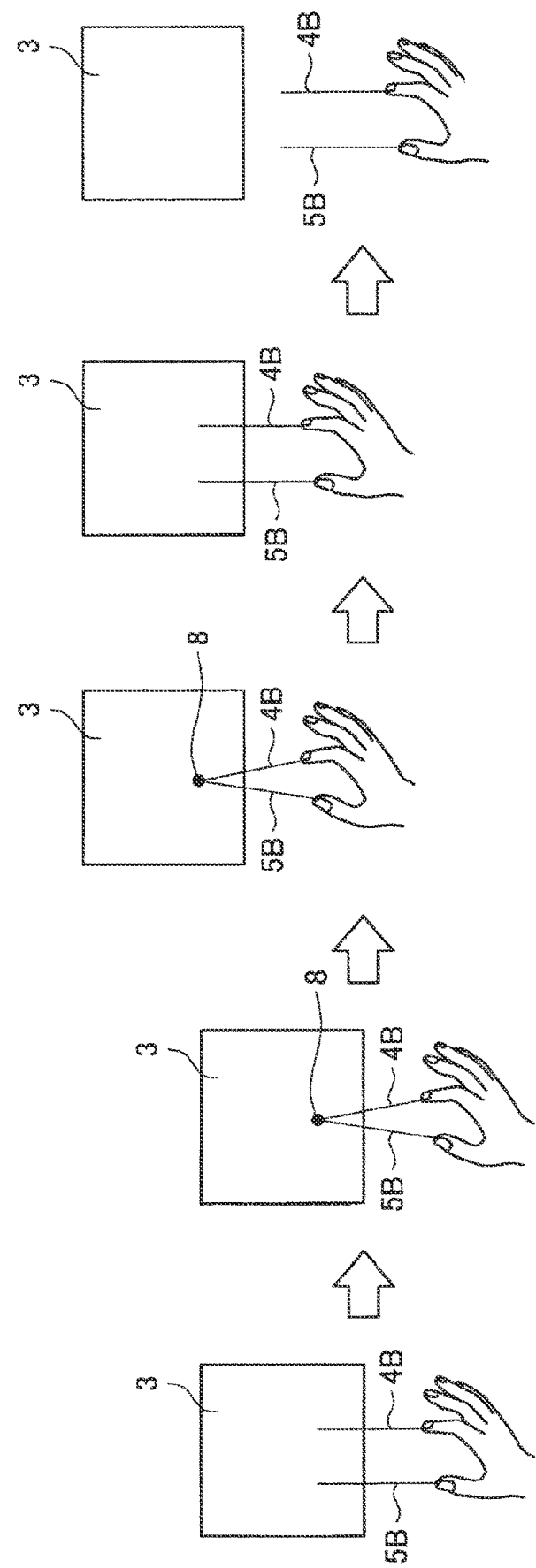
FIG. 12 is a schematic diagram depicting another example of the processing performed by the control section of the display control apparatus as the embodiment.

FIG. 12 depicts an example in which the operating position is not recognized, is recognized, and is used for operation on the object in timeline. The user indicates the operating lines 4B and 5B in parallel with each other. At this time, no operation is performed even if the operating lines 4B and 5B come into contact with and enter the object 3.

The user then brings the operating lines 4B and 5B into contact with each other inside the object 3 to form an intersection point 8 therein. This causes the control section 120 to recognize the operating position inside the object 3.

Next, the user moves the operating lines 4B and 5B while the intersection point 8 therebetween is kept unchanged. At this time, the control section 120 moves the object 3 as the operating position. This control maintains the positional relation between the operating position and the object 3 while the object 3 is being moved.

The user then changes the direction in which to indicate each of the operating lines 4B and 5B inside the object 3, i.e., holds the operating lines 4B and 5B in parallel with each other, so as not to form an intersection point therebetween. This suppresses recognition of the operating position and disables operations on the object 3. Then, with the operating lines 4B and 5B held apart so as not to form an intersection point therebetween, the operating lines 4B and 5B as well as the position of the hand serving as the indicator bodies are shifted to move the object 3 to a desired position. This completes the task involved.

As described above, where the intersection point is formed inside the object 3, it is possible to designate the timing for the operating position. Thus, in the three-dimensional space, the display control apparatus 100 allows an optional point to be indicated at a desired timing, thereby permitting operations on the object 3.

Note that it is explained above that, in a case where the operating position is not recognized as depicted in FIG. 9, operation control of the object is not performed. In some cases, however, operations may be assigned to the object even if the operating position is not recognized.

For example, in a state where the two operating lines come into contact with or enter the object as depicted in FIG. 9, operations on the object may be permitted, i.e., operations different from those in the case where the operating position is recognized may be assigned. This makes it possible to increase the number of operations that may be performed on the object.

Figure 13:
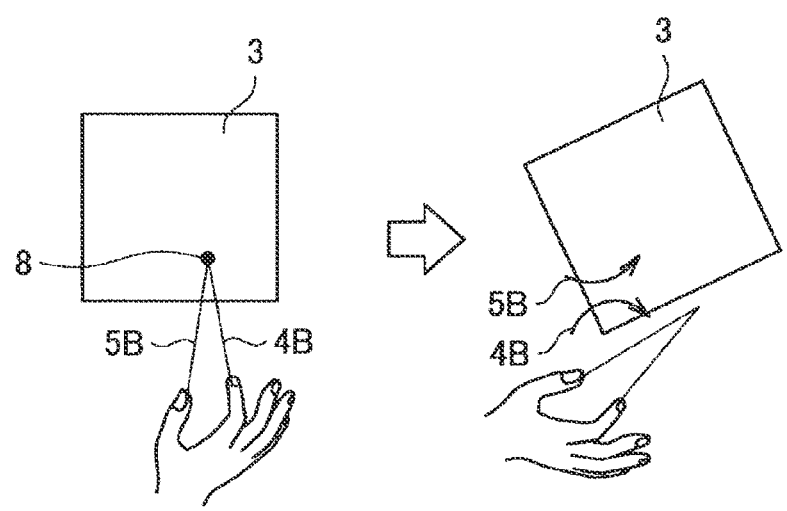
FIG. 13 is a schematic diagram depicting another example of the processing performed by the control section of the display control apparatus as the embodiment.

FIG. 13 depicts an example in which the object 3 is rotated as an operation on the object 3. The user causes the operating lines 4B and 5B to come into contact with each other inside the object 3 to form the intersection point 8 therein. This causes the control section 120 to recognize the operating position.

The user then moves rotationally both the indicator bodies and the operating lines extending therefrom around the wrist that serves as the base body supporting the indicator bodies. This causes the object 3 to rotate without entailing a shift in its center of gravity. The control section 120 may make a distinction between a movement of the operating position and a rotation thereof according to the initial velocity of change in the operating position, for example. Specifically, it may be determined that the movement of the operating position at an initial velocity equal to or less than a threshold value is an operation to move the entire object 3 and that the movement of the operating position at an initial velocity higher than the threshold value is an operation to rotate the operating position. The distinction between the movement and the rotation is not limited to the manner in which the operating position is moved. Alternatively, the control section 120 may perform image recognition of the indicator bodies so as to determine whether the user has indicated a movement or a rotation of the object given the motion of the user's indicator bodies.

Figure 14:
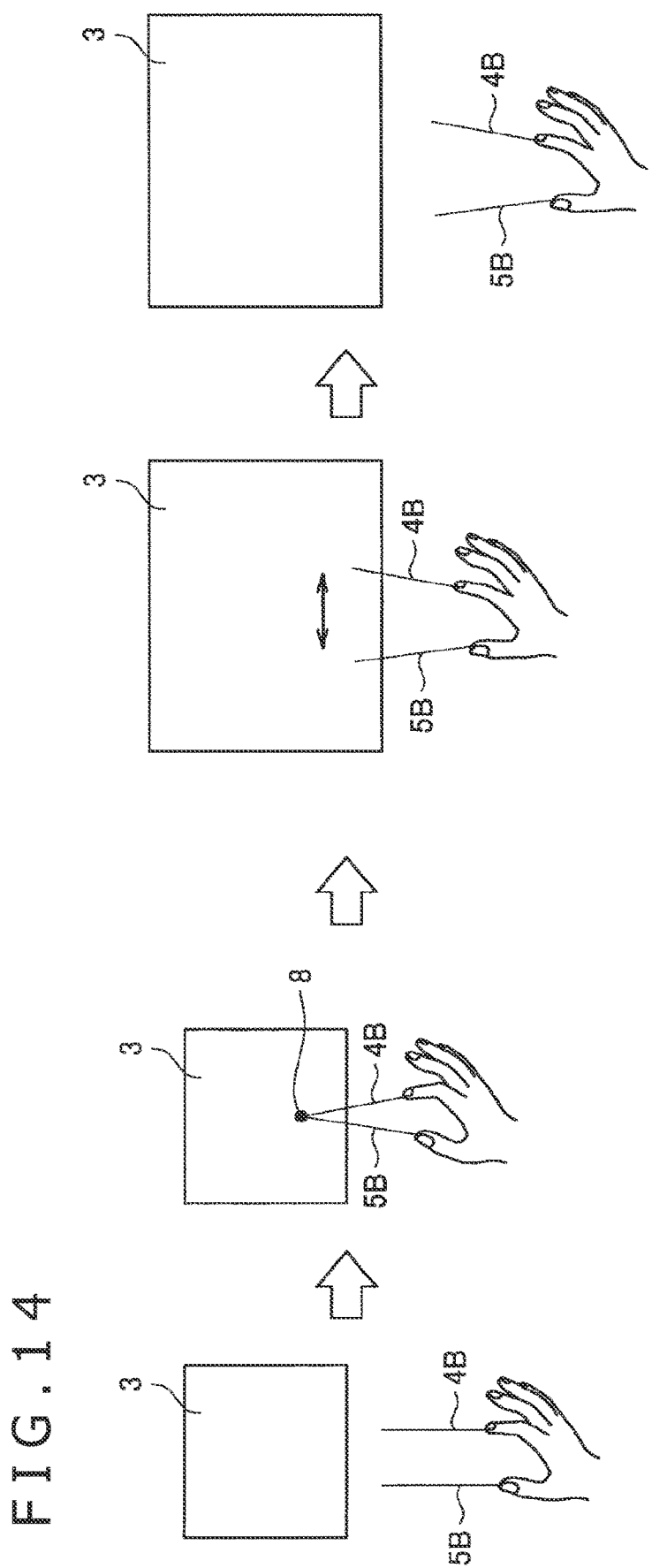
FIG. 14 is a schematic diagram depicting another example of the processing performed by the control section of the display control apparatus as the embodiment.

FIG. 14 depicts an example in which operations are performed to enlarge the object 3. The user keeps the operating lines 4B and 5B from intersecting with each other outside the object 3 before letting them enter the object 3. Once inside the object 3, the operating lines 4B and 5B are brought into contact with each other to form the intersection point 8. This causes the control section 120 to recognize the operating position.

The user then stops forming the intersection point and brings the operating lines 4B and 5B away from each other. This causes the object to be enlarged three-dimensionally by the amount of the distance increasing between the operating lines 4B and 5B while the rate at which the distance is enlarged is maintained. In such a manner, the object 3 in the position corresponding to the operating position may be enlarged.

With the foregoing examples, it is explained that the object 3 in the position corresponding to the operating position is operated using the above-described internal configuration. Although it is explained above that the display control apparatus 100 of the present embodiment is caused to perform display and other processes, this is not limitative of the present disclosure. Alternatively, the functions and processes implemented by the constituent elements of the above configuration may be taken over by other apparatuses on a distributed basis.

(2.3 Operation Flow)

Figure 15:
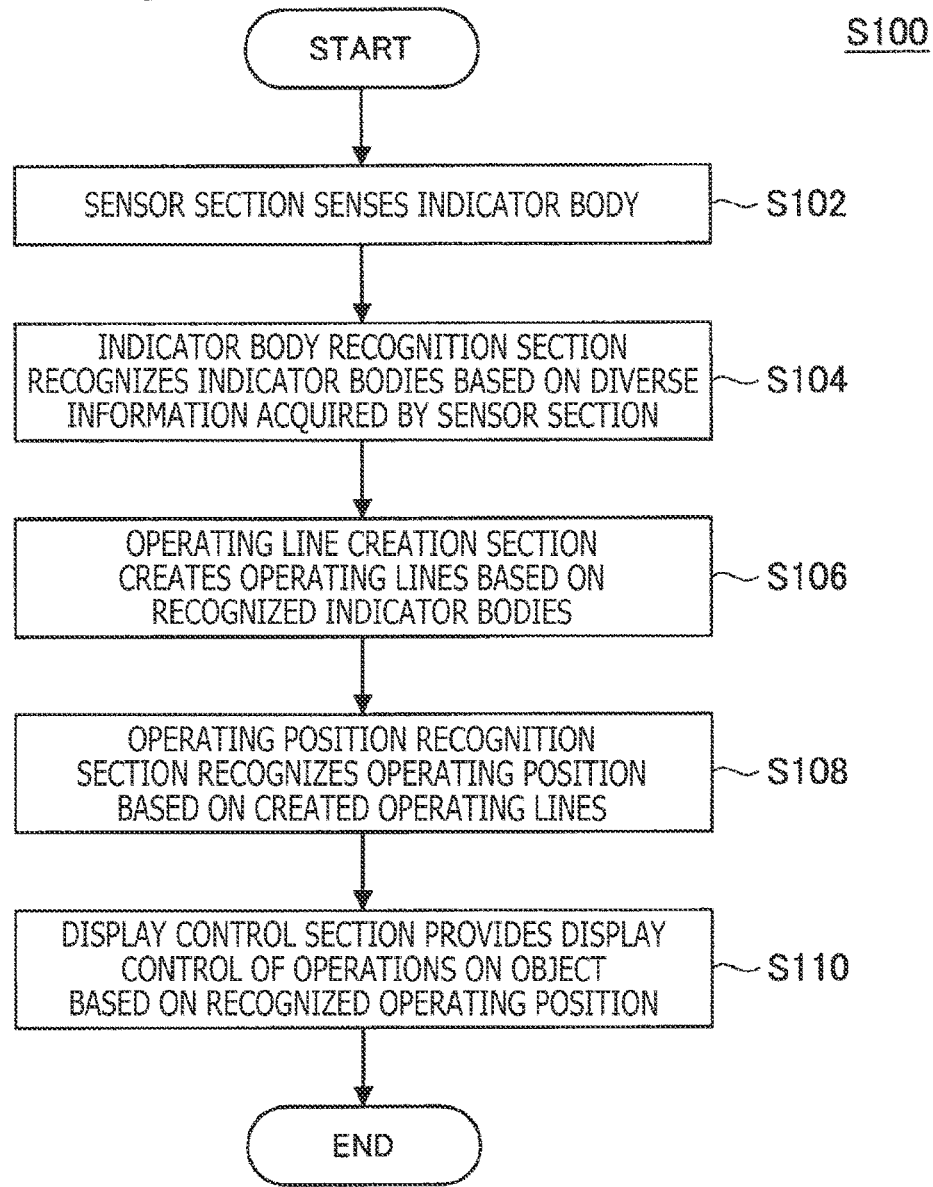
FIG. 15 is a schematic diagram depicting an example of an operation flow of the display control apparatus as the embodiment.

Described below with reference to FIG. 15 is an operation flow (S100) of the display control apparatus 100.

First, the sensor section 110 senses, for example, the indicator bodies (S102).

Then, the indicator body recognition section 121 recognizes the indicator bodies based on various kinds of information obtained by the sensor section 110 (S104).

Then, the operating line creation section 122 creates the operating lines based on the recognized indicator bodies (S106).

Then, the operating position recognition section 123 recognizes the operating position based on the created operating lines (S108).

Finally, the display control section 124 performs display control of operations on the object based on the operating position (S110).

The above-described operation flow allows the display control apparatus 100 to operate the object with as little motion as possible.

3. Alternative Examples

What follows is a description of alternative examples of the above embodiment.

Alternative Example (1)

Figure 16:
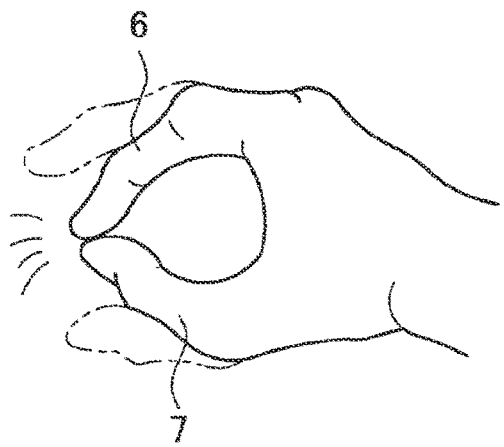
FIG. 16 is a schematic diagram depicting an alternative example of the processing performed by the control section of the display control apparatus as the embodiment.

In the above-described embodiment, the display control apparatus 100 performs operation control of the object based on the recognized operating position. Alternatively, besides controlling the operations on the object, the display control apparatus 100 may control operations on the operating lines. For example, the control section 120 may recognize a tapping operation performed by the indicator bodies and provide a predetermined operation in response to the recognized tapping operation. At this time, the display control apparatus 100 recognizes continuous taps performed by the indicator bodies within a predetermined period of time. FIG. 16 depicts how taps are carried out by the index finger 6 and the thumb 7 serving as the indicator bodies. For example, the display control apparatus 100 may cause the operating lines to appear upon recognizing the tapping operation as a trigger.

Alternative Example (2)

Figure 17:
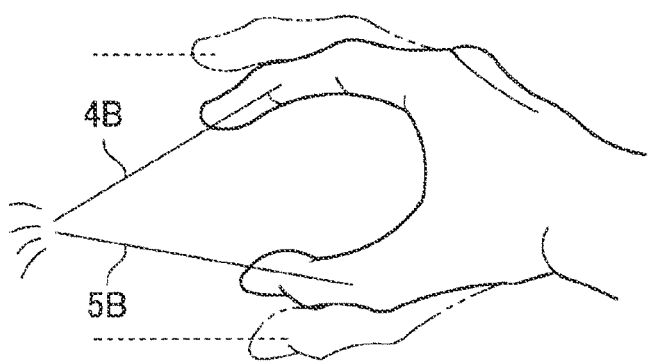
FIG. 17 is a schematic diagram depicting another alternative example of the processing performed by the control section of the display control apparatus as the embodiment.

Besides recognizing the tapping operations performed by the indicator bodies as described above in the alternative example (1), the display control apparatus 100 may recognize a tapping operation on the operating lines and provide a predetermined operation in response to the recognized tapping operation on the operating lines. FIG. 17 depicts how the operating lines 4B and 5B are tapped. For example, using the tapping operation as a trigger, the display control apparatus 100 may perform such operations as calling up a menu, selecting and indicating the object 3, cutting off the object 3, or writing markers. At this time, when the operations are switched over, the display control apparatus 100 may change the display mode features of the operating lines.

Alternative Example (3)

Figure 18:
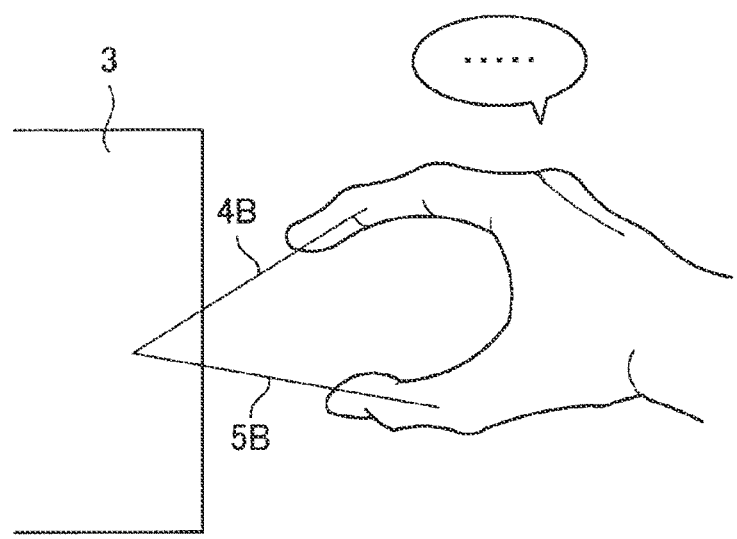
FIG. 18 is a schematic diagram depicting another alternative example of the processing performed by the control section of the display control apparatus as the embodiment.

Besides recognizing the tapping operation discussed in the alternative examples (1) and (2) above, the display control apparatus 100 may recognize a long-press operation and provide a predetermined operation in response thereto. The long-press operation means an operation to have the operating lines 4B and 5B brought into contact with each other and kept motionless in that state. At this time, the display control apparatus 100 recognizes the prolonged press operation on the indicator bodies or on the operating lines for a predetermined period of time. The predetermined period of time may be approximately two seconds. In particular, the long-press operation may be assigned in the case where the intersection point (operating position) between the operating lines 4B and 5B is inside the object. This makes it possible to select the type of operation inside the object. FIG. 18 depicts how the operating lines 4B and 5B are long-pressed.

For example, using the long-press operation as a trigger, the display control apparatus 100 may perform operations to change the state of the object, call up a menu, select and indicate the object 3, cut off the object, or write markers. Note that, whereas the alternative examples (1) through (3) above are cases in which the intersection point is formed by two indicator bodies, this is not limitative of the present disclosure. Alternatively, without recognizing the operating position corresponding to the intersection point, the display control apparatus 100 may recognize operations to shake two indicator bodies alternately and provide a predetermined operation in response to the recognized shaking operations, as in the tap operation.

Alternative Example (4)

The description of the embodiment in the foregoing paragraphs centered primarily on the cases involving two indicator bodies. Alternatively, in the case where there is one indicator body, the display control apparatus 100 may create multiple operating lines to perform operation control of the object.

Figure 19:
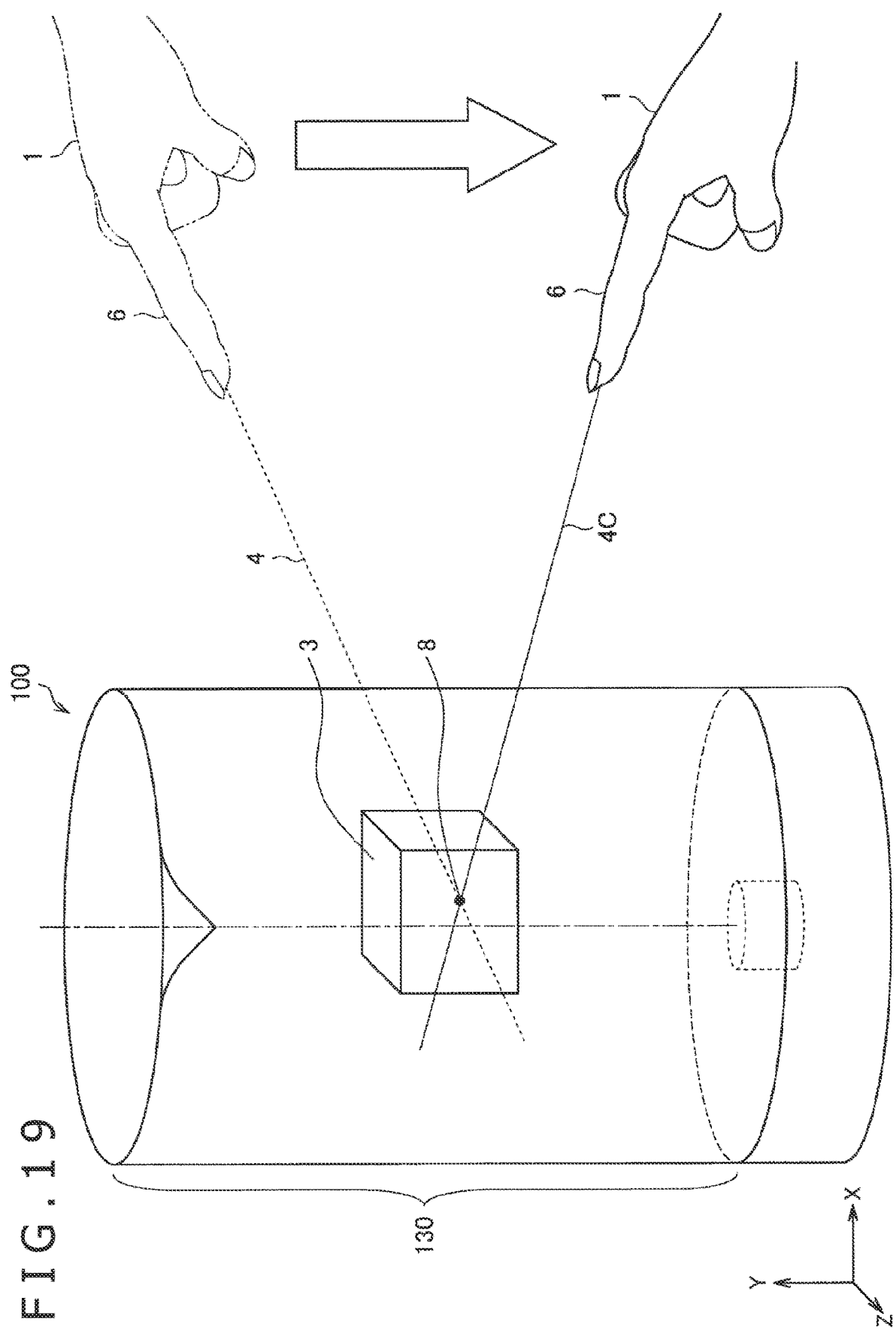
FIG. 19 is a schematic diagram depicting another alternative example of the processing performed by the control section of the display control apparatus as the embodiment.

FIG. 19 depicts an example in which multiple operating lines are created by use of a single indicator body. As depicted in FIG. 19, the object 3 is displayed three-dimensionally in the display section 130 of the display control apparatus 100. The display control apparatus 100 may recognize as one operating line the operating line 4B extending from the index finger 6 of the user 1 and may recognize as another operating line an operating line 4C extending from the index finger 6 of the user 1 positioned elsewhere. The display control apparatus 100 may then recognize the intersection point 8 between these two operating lines as the operating position and thereby control operations on the object 3.

Alternative Example (5)

Figure 20:
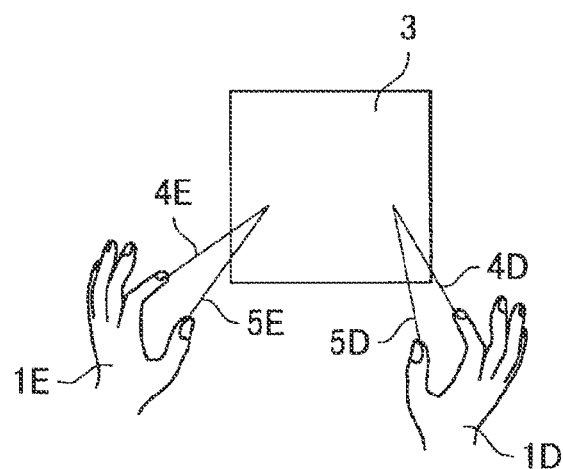
FIG. 20 is a schematic diagram depicting another alternative example of the processing performed by the control section of the display control apparatus as the embodiment.

Discussed so far have been the cases where there is one intersection point (operating position) between multiple operating lines. Alternatively, there may be multiple operating positions. FIG. 20 depicts an example in which operations on the object are controlled in a case where two operating positions exist.

For example, as depicted in FIG. 20, the display control apparatus 100 recognizes a right hand 1D and a left hand 1E of the user 1 serving as the base body supporting the indicator bodies. The indicator bodies consist of an index finger 4D and a thumb 5D of the right hand 1D as well as the index finger 4E and thumb 5E of the left hand 1E. In such a manner, the display control apparatus 100 may let two or more operating positions appear simultaneously to enable the user's more intuitive operations.

As a specific operation using two operating positions, the display control apparatus 100 may allow the object to be moved only in the case where two operating positions come into contact with or enter the object. Also, the display control apparatus 100 may enlarge or reduce the object in size depending on the two operating positions being brought close to or apart from each other.

In this alternative example, the operating positions created by the right hand 1D and left hand 1E of the user 1 are recognized. Yet, there may be many other alternatives including one in which one hand of the user 1 and one hand of another user are combined to create operating positions. As a further alternative, the operating lines may be created using not only the hands or fingers of the user but also the arm or arms of the user, as the indicator bodies.

Alternative Example (6)

The above embodiment is discussed in conjunction with the examples in which the intersection point between multiple operating lines is recognized as the operating position. However, these examples are not limitative of the present disclosure. Alternatively, one operating line may be used to recognize the operating position for control of operations on the object. Specifically, the control section 120 may switch from the control using two operating lines over to the control using one operating line for control of operations on the object. Such switchover permits simplification of operations depending on the circumstances. The switchover may be timed to be carried out in a manner reflecting changes in the state of the indicator bodies.

For example, the operating position may be recognized using one operating line in a case where only the index finger is extended or using two operating lines in a case where the index finger and the thumb are extended. The switchover may otherwise be performed in a suitably timed manner such as when the user gives appropriate indications. As another alternative, the display control apparatus 100 may automatically execute the switchover depending on how the indicator bodies are being recognized.

Figure 21:
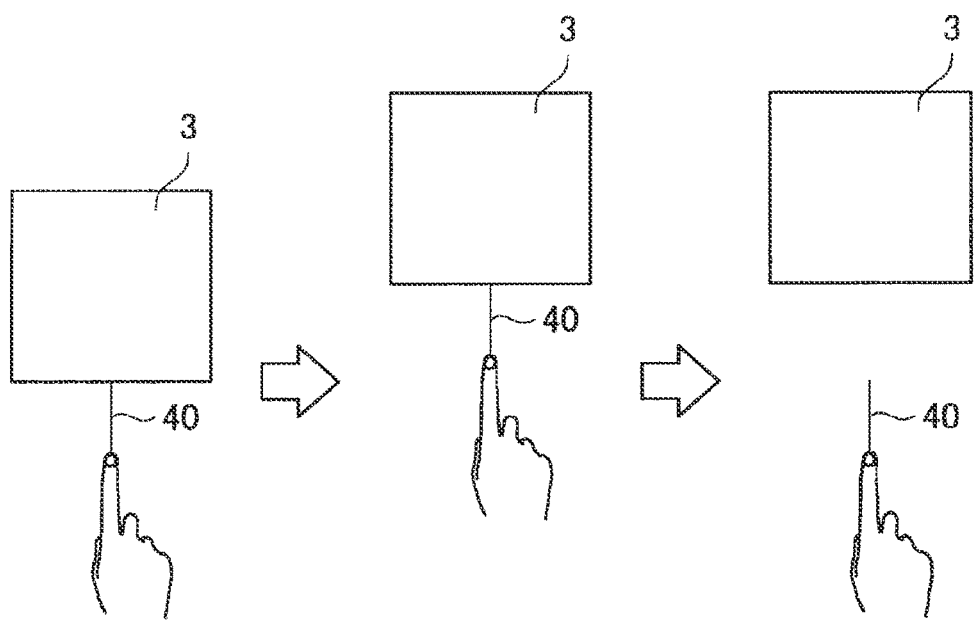
FIG. 21 is a schematic diagram depicting another alternative example of the processing performed by the control section of the display control apparatus as the embodiment.

FIG. 21 depicts an example in which operations on the object are controlled by use of one operating line. In the case where the object is controlled using one operating line, the operating position may be the endpoint of the single operating line or a point at which an extended operating line comes into contact with the object.

As depicted in FIG. 21, when the display control apparatus 100 recognizes the endpoint of an operating line 40 as the operating position coming into contact with the object, operations on the object start to be controlled. When the operating line 40 comes into contact with the object 3 and then moves, the object 3 is moved accordingly. When the endpoint of the operating line 40 is separated from the object 3, the operations are terminated.

Alternative Example (7)

The above embodiment is described primarily in conjunction with the examples in which the operating lines are created by use of two fingers of the user serving as the indicator bodies. However, these examples are not limitative of the present disclosure. Alternatively, the display control apparatus 100 may create the operating lines by using the user's three fingers recognized as the indicator bodies.

Figure 22:
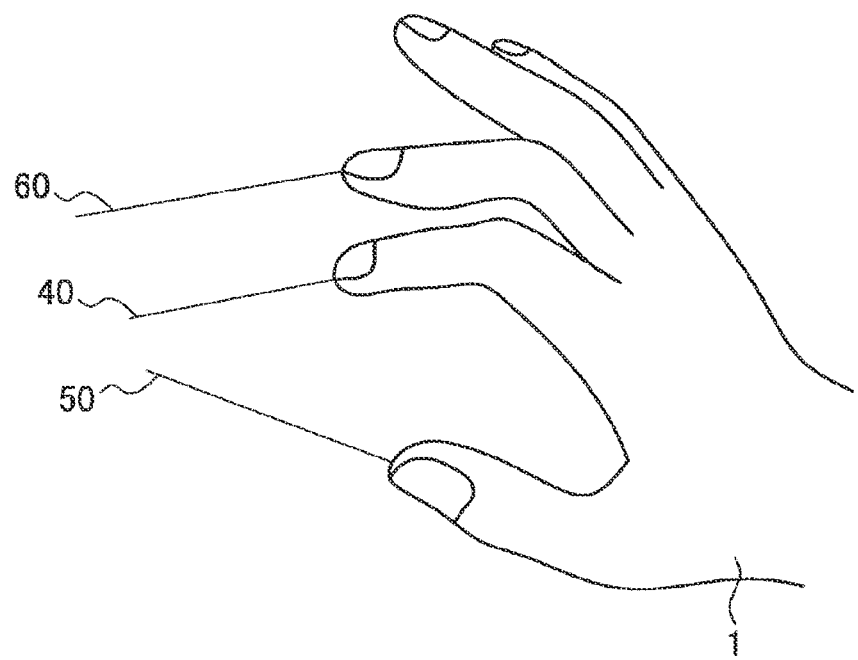
FIG. 22 is a schematic diagram depicting another alternative example of the processing performed by the control section of the display control apparatus as the embodiment.

FIG. 22 depicts an example in which the operating lines are created by use of three fingers serving as the indicator bodies. As depicted in FIG. 22, the display control apparatus 100 may recognize the operating position by creating operating lines 40, 50, and 60 using the index finger, the thumb, and the middle finger of the user 1 as the indicator bodies. At this time, part of the operating lines (e.g., those of the thumb and index finger) may be assigned to the operation of creating the intersection point and the remaining operating line to other operations.

Also, the display control apparatus 100 may assign operations only in the case where three operating lines indicate one intersection point. This makes it possible to provide more assignable operations in the case where there are three operating lines than in the case where there exist two operating lines.

Alternative Example (8)

The above embodiment is discussed in conjunction with the examples in which the intersection point between the operating lines is recognized as the operating position. Alternatively, the display control apparatus 100 may not only recognize the above-described intersection point as the operating position but also recognize an extended plane as the operating position.

Figure 23:
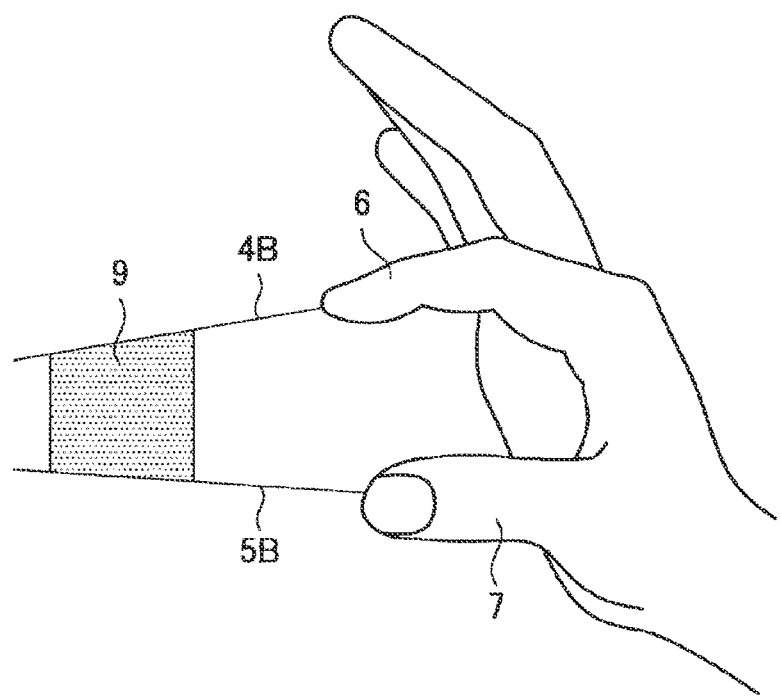
FIG. 23 is a schematic diagram depicting another alternative example of the processing performed by the control section of the display control apparatus as the embodiment.

Referring to FIG. 23, the display control apparatus 100 may recognize as the operating position a part of the plane defined by the operating lines 4B and 5B extending from the index finger 6 and the thumb 7, for example. At this time, the operating lines 4B and 5B may or may not form the intersection point therebetween.

The plane defined by the operating lines 4B and 5B may be one on which a plane including the operating line 4B and a plane including the operating line 5B coincide with each other. By recognizing such a plane as the operating position, the display control apparatus 100 may control operations on the object over a more extensive range than before.

Alternative Example (9)

The above embodiment is described in conjunction with the examples in which the intersection point between the operating lines is recognized as the operating position. Alternatively, the display control apparatus 100 may provide control of operations on the object when at least the endpoints of the displayed operating lines enter the object without the above-described intersection point being recognized as the operating position.

Figure 24:
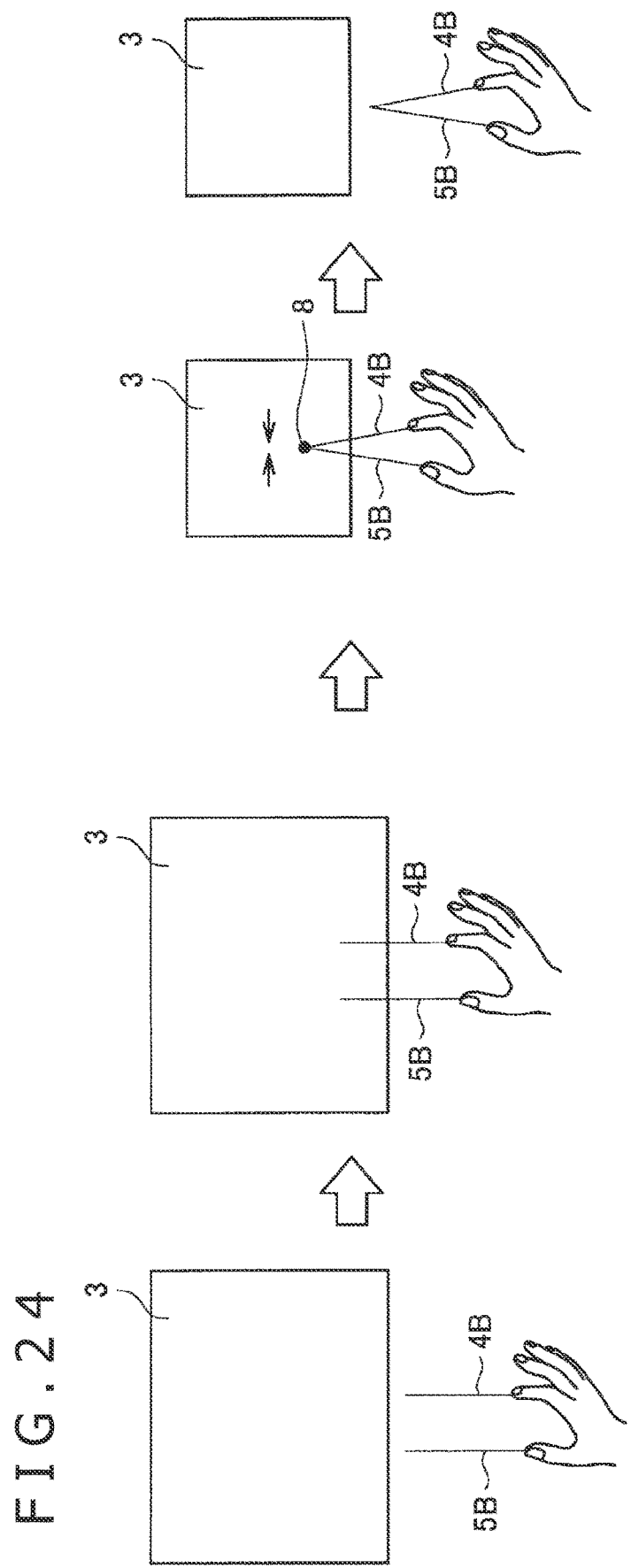
FIG. 24 is a schematic diagram depicting another alternative example of the processing performed by the control section of the display control apparatus as the embodiment.
Figure 25:
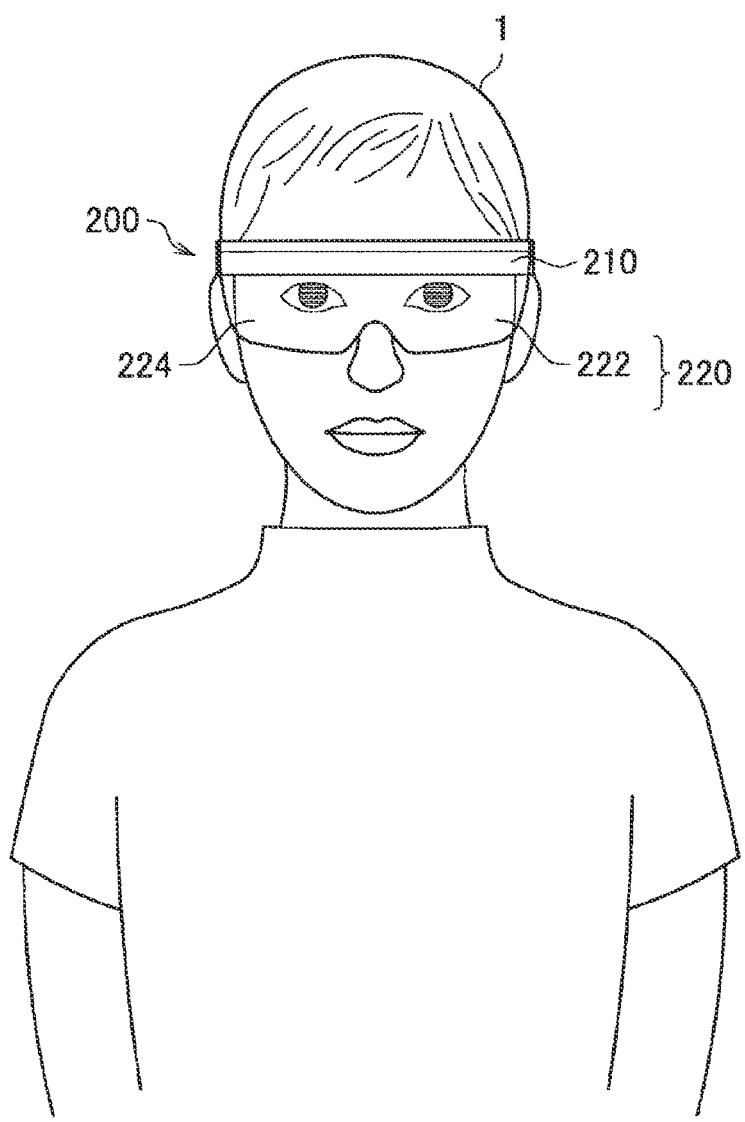
FIG. 25 is a schematic diagram depicting an alternative example of the display control apparatus as the embodiment.

FIG. 24 depicts an example in which operations on the object are controlled without any intersection point being recognized as the operating position. As depicted in FIG. 25, the user holds the operating lines 4B and 5B apart from each other outside the object 3.

With the above state kept unchanged, the user allows the operating lines 4B and 5B to enter the object 3.

Thereafter, the user brings the operating lines 4B and 5B close to each other to form the intersection point 8 inside the object 3. At this time, the object 3 is reduced at a rate similar to the rate at which the distance between the operating lines 4B and 5B is shortened.

After the reduction, the user moves the extended lines 4 and 5 out of the object. This terminates the operations on the object.

As described above, the display control apparatus 100 may control operations on the object with or without the operating position being recognized. Although the above example is given to explain how the reduction is carried out, whether or not to perform the reducing operation may be determined depending on the object.

Alternative Example (10)

Figure 26:
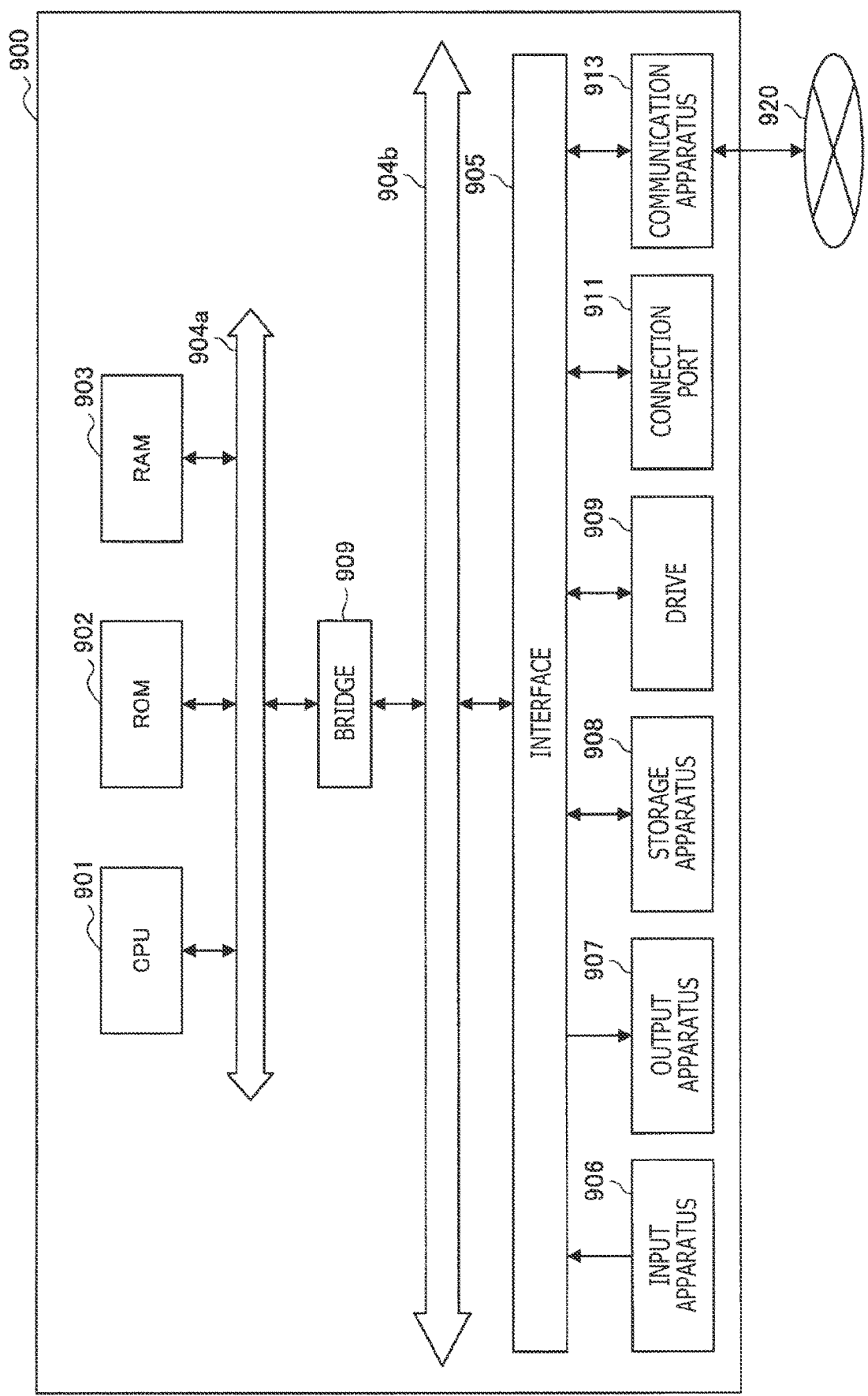
FIG. 26 is a schematic diagram depicting a hardware configuration example of the display control apparatus as the embodiment.

The above embodiment is described in conjunction with the examples in which the cylindrically-shaped display control apparatus 100 displays the operating lines for operating the object. Alternatively, the object may be operated by a transmissive or non-transmissive eyeglass-type display control apparatus. Referring to FIG. 26, a transmissive or non-transmissive eyeglass-type display control apparatus 200 may be used to perform display control while displaying the operating lines and extended lines as a whole. FIG. 25 depicts how the user 1 may wear transmissive eyeglasses D1.

The display control apparatus 200 depicted in FIG. 25 has, for example, a wearing unit 210 with a frame structure encircling the head of the user, the wearing unit 210 securing the display control apparatus 200 to the user's head. The display control apparatus 200 is provided with a left-eye display section 222 and a right-eye display section 224 paired with each other (hereinafter, referred to as the display section 220 in the case of covering both eyes) in front of the user's eyes.

The display section 220 is configured using a transmissive display, for example. The display control apparatus 200 may control the transmittance of the transmissive display so as to control the display section 220 in a through-state (i.e., transparent state) or in a translucent state. With the display section 220 put in the through-state, the display control apparatus 200 may be used in a manner similar to that of eyeglasses. That means the user can lead a normal life while continuously wearing the display control apparatus 200.

The display section 220 can superpose the object on a real-space landscape by displaying an image of the object 3 or of the operating lines while in the transparent or translucent state. That is, the display control apparatus 200 may be implemented as a transmissive HMD. Note that, in the case of the transmissive HMD, the wearing unit 210 may fasten the display control apparatus 200 to the user's head in a manner stabilizing a relative positional relation between both eyes of the user and the display section 220.

The display section 220 may also be configured as a non-transmissive display apparatus. The display section 220 may, while displaying a real-space image captured by a camera, allow a virtual object to be superposed on that captured image. Further, while displaying a virtual-space image as if a real-space image were captured by a camera and presented, the display section 220 may superpose the object and the operating lines on the virtual-space image. In other words, the display control apparatus 200 may be implemented as an immersive (video see-through type) HMD.

The display section 220 may otherwise be implemented as an LED (Light Emitting Diode) light source for projecting images directly onto the user's retinas. That is, the display control apparatus 200 may be implemented as a projection type HMD.

The display section 220 may display diverse content in the form of objects. For example, the content may be data representative of menu details, screens indicative of the types of operations to be performed by the user on the object, and additional information corresponding to real objects.

Further, although not depicted in FIG. 25, the display control apparatus 200 may have a sound output function such as speakers or earphone speakers. The display control apparatus 200 may also have a microphone for picking up external sounds.

Incidentally, the appearance of the display control apparatus 200 depicted in FIG. 25 is only an example. There may be diverse structures allowing the user to wear the display control apparatus 200. It is sufficient if the display control apparatus 200 is configured together with what is generally known as an eyeglass-type or hat type wearing unit. As an embodiment of the present disclosure, it is sufficient if the display control apparatus 200 is provided with the display section 220 positioned at least close to the user's eyes. In addition, the display section 220 may be configured in either a binocular type or monocular type structure.

The display control apparatus 200 may be provided with a sensor section. The sensor section may be an imaging apparatus attached to the display control apparatus 200. Alternatively, the sensor section may be attached to a finger or an arm of the user.

In the case where the display control apparatus 200 is a non-transmissive display control apparatus, the operating lines may be displayed superposed not on the user's real hand but on a virtual-object hand of the user presented in a virtual space. In the case where the display control apparatus 200 is a transmissive display control apparatus, the operating lines may be displayed on the virtual object or superposed on the user's real hand as discussed above.

By means of the above-described display control apparatus 200, the user can visually recognize the operating lines and thereby perform operations on the object. As another alternative, the display control apparatus 200 may possess only the function of the display section 130 in the above-described embodiment and have the other components and functions taken over by other apparatuses.

4. Hardware Configuration Example

A hardware configuration example of the display control apparatus 100 according to the present embodiment is described below with reference to FIG. 26. FIG. 26 is a block diagram depicting one hardware configuration example of the display control apparatus as the present embodiment.

As depicted in FIG. 26, an information processing apparatus 900 has a CPU (Central Processing Unit) 901, a ROM (Read Only Memory) 902, a RAM (Random Access Memory) 903, and a host bus 904a. The information processing apparatus 900 also has a bridge 904, an external bus 904b, an interface 905, an input apparatus 906, a display apparatus 907, a storage apparatus 908, a drive 909, a connection port 911, and a communication apparatus 913. Instead of or in addition to the CPU 901, the information processing apparatus 900 may possess processing circuits such as electrical circuits, DSP, or ASIC.

The CPU 901 functions as an arithmetic processing unit and a control unit and controls the overall operations of the information processing apparatus 900 in accordance with various programs. Alternatively, the CPU 901 may be a microprocessor. The ROM 902 stores programs and operation parameters for use by the CPU 901. The RAM 903 temporarily stores the programs used by the CPU 901 in executing processes as well as parameters that vary as needed during the execution. For example, the CPU 901 may constitute the control section 120 depicted in FIG. 2.

The CPU 901, the ROM 902, and the RAM 903 are interconnected by the host bus 904a including a CPU bus. The host bus 904a is connected via the bridge 904 to the external bus 904b such as a PCI (Peripheral Component Interconnect/Interface) bus. Incidentally, it is not mandatory to have the host bus 904a, the bridge 904, and the external bus 904b separately configured. These functions may be implemented in the form of a single bus.

The input apparatus 906 is implemented using an apparatus through which the user inputs information such as a mouse, a keyboard, a touch panel, buttons, a microphone, switches, and/or levers. Alternatively, the input apparatus 906 may be a remote-control apparatus that uses infrared rays or other radio waves, or an externally connected apparatus such as a mobile phone or PDA supporting the operations of the information processing apparatus 900. Also, the input apparatus 906 may include an input control circuit that generates input signals based on the information input by the user by using the above-mentioned input means and outputs the generated input signals to the CPU 901. By operating the input apparatus 906, the user of the information processing apparatus 900 may input various kinds of data to or designate processing operations for the information processing apparatus 900. For example, in the case of a touch panel, the display section 130 may be equipped with the touch panel function.

The display apparatus 907 is configured with an apparatus capable of notifying the user of acquired information visually or audibly. This type of apparatus includes a display apparatus such as a CRT display apparatus, a liquid crystal display apparatus, a plasma display apparatus, an EL display apparatus, a laser projector, an LED projector, or lamps; and a sound output apparatus such as speakers or headphones. The display apparatus 907 outputs the result of diverse processing performed by the information processing apparatus 900, for example. Specifically, the display apparatus 907 visually outputs the result of the diverse processing carried out by the information processing apparatus 900 in various forms such as texts, images, tables, and graphic representations. On the other hand, the sound output apparatus, when used, converts audio signals including reproduced voice data and audio data into analog signals for audible output. The display apparatus 907 may constitute the display section 130 depicted in FIG. 2. The sound output apparatus may make up the sound output section 140 depicted in FIG. 2.

The storage apparatus 908 is an apparatus for data storage configured as a typical storage section of the information processing apparatus 900. For example, the storage apparatus 908 is implemented using a magnetic storage device such as an HDD, a semiconductor storage device, an optical storage device, or a magneto-optical storage device. The storage apparatus 908 may include storage media, a recording apparatus for recording data to the storage media, a readout apparatus for reading data from the storage media, and a deleting apparatus for deleting data recorded on the storage media. The storage apparatus 908 stores the programs and various kinds of data to be executed and operated on by the CPU 901, as well as various kinds of data acquired from the outside. For example, the storage apparatus 908 may constitute the storage section 150 depicted in FIG. 2.

The drive 909 is a reader/writer for storage media and is built in, or externally attached to, the information processing apparatus 900. The drive 909 reads information recorded on removable storage media such as a magnetic disk, an optical disk, a magneto-optical disk, or a semiconductor memory being attached, and outputs the retrieved information to the RAM 903. The drive 909 can write information to the removable storage media as well.

The connection port 911 is an interface for connection with an external apparatus. For example, the connection port 911 is a port such as a USB (Universal Serial Bus) port permitting data exchange with an external apparatus.

The communication apparatus 913 is a communication interface configured using a communication device for connection with a network 920, for example. The communication apparatus 913 is a communication card for use with wired or wireless LAN (Local Area Network), LTE (Long Term Evolution), Bluetooth (registered trademark), or WUSB (Wireless USB) arrangements, for example. Alternatively, the communication apparatus 913 may be an optical communication router, an ADSL (Asymmetric Digital Subscriber Line) router, or a modem for various communication uses. For example, the communication apparatus 913 may transmit and receive signals to and from the Internet and other communication devices in accordance with predetermined protocols such as TCP/IP. The communication apparatus 913 is implemented diversely in the configuration depicted in FIG. 2, for example, and may be used for data exchange between the control section 120 and the sensor section 110.

Note that the network 920 is a wired or wireless transmission path for information transmitted from apparatuses connected to the network 920. For example, the network 920 may include public networks such as the Internet, telephone networks, and satellite communication networks, as well as diverse LAN (Local Area Network) and WAN (Wide Area Network) options including Ethernet (registered trademark). The network 920 may also include leased line networks such as IP-VPN (Internet Protocol-Virtual Private Network).

Further, the information processing apparatus 900 may create a computer program for allowing the hardware components such as the CPU, the ROM, and the RAM built in the display control apparatus 100 to provide functions equivalent to those of the constituent elements of the display control apparatus 100. Further, a storage medium on which the computer program thus created is stored also falls within the technical scope of the present disclosure.

Whereas the preferred embodiment of the present disclosure has been described above in detail with reference to the accompanying drawings, the embodiment is not limitative of the technical scope of the present disclosure. It is obvious that those skilled in the art will easily conceive variations or alternatives of the disclosure within the scope of the technical idea stated in the appended claims. It is to be understood that such variations, alternatives, and other ramifications also fall within the technical scope of the present disclosure.

For example, whereas it is explained above that the present disclosure is embodied as a cylindrically-shaped display control apparatus, this is not limitative of the present technology. Alternatively, the display control apparatus may be a flat display.

Further, the present technology may be applied to apparatuses for diverse uses. One such use may be a music presentation apparatus equipped with speakers and a display section. The content displayed by that display section may be music-related content such as information regarding artists, for example. The content displayed in this case may alternatively be that which is synchronized with the music.

Other uses of the present technology include presentation apparatuses. For example, the technology may be applied to an apparatus for presenting a 3D model of the heart in medical training sessions. Such an apparatus may alternatively be used for presenting study materials in remote learning sessions. The present technology may also be applied to the test display of 3D models during a manufacturing process. Such a presentation apparatus may be shared by multiple users and may be given instructions remotely over networks.

In another use, the present technology may be applied to information distribution apparatuses. One such distribution apparatus may distribute three-dimensional advertisements or performances of pop stars. This technology may also be applied to digital signage.

The advantageous effects stated in this description are only for illustrative purposes and are not limitative of the present disclosure. That is, in addition to or in place of the above-described advantageous effects, the technology of the present disclosure may provide other advantageous effects that will be obvious to those skilled in the art in view of the above description.

Note that the following configurations also fall within the technical scope of the present disclosure:

(1)
A display control apparatus including:
a control section configured to control an operation on an object in a position corresponding to an operating position recognized on the basis of a relation between multiple operating lines each displayed corresponding to an indicator body.

(2)
The display control apparatus as stated in paragraph (1) above, in which
the operating line is displayed on an extended line from the indicator body.

(3)
The display control apparatus as stated in paragraph (2) above, in which
there exist multiple indicator bodies, and
the extended lines extend from the multiple indicator bodies in a direction in which the multiple indicator bodies are extended.

(4)
The display control apparatus as stated in paragraph (3) above, further including:
a display section configured to present a user with a display region for displaying the object three-dimensionally.

(5)
The display control apparatus as stated in paragraph (4) above, in which
the control section provides control such that those portions of the extended lines stretching into the display region are displayed as the operating lines.

(6)
The display control apparatus as stated in any one of paragraphs (1) to (5) above, in which,
given the multiple operating lines, the control section recognizes the operating position by determining whether or not a length of the shortest line segment connecting a first operating line and a second operating line is equal to or less than a threshold value.

(7)
The display control apparatus as stated in paragraph (6) above, in which
the control section regards a midpoint of the shortest line segment as the operating position.

(8)
The display control apparatus as stated in paragraph (6) above, in which
the control section regards as the operating position a partial region on a plane defined by the first operating line and by the second operating line.

(9)
The display control apparatus as stated in any one of paragraphs (6) to (8) above, in which
the control section presents the user with the operating position, based on the recognition thereof, and
the presentation is made by use of at least one from among a display mode feature change, an audio notification, or a vibration notification.

(10)
The display control apparatus as stated in any one of paragraphs (6) to (9) above, in which
the control section controls the operation on the object in a case where the operating position either comes into contact with or enters the object.

(11)
A display apparatus for displaying multiple operating lines each displayed corresponding to an indicator body, the operating lines being displayed to let an operating position be recognized on the basis of a relation therebetween, the operating position corresponding to a position in which an object is allowed to be operated.

(12)
The display apparatus as stated in paragraph (11) above, in which
the display apparatus is worn by a user, and
the display apparatus presents the user with a display region for displaying the object three-dimensionally, the multiple operating lines being displayed superposed on the indicator bodies.

(13)
A display control method including:
causing a processor to control an operation on an object in a position corresponding to an operating position recognized on the basis of a relation between multiple operating lines each displayed corresponding to an indicator body.

(14)
A program for causing a computer to function as:
a control section that controls an operation on an object in a position corresponding to an operating position recognized on the basis of a relation between multiple operating lines each displayed corresponding to an indicator body.

REFERENCE SIGNS LIST

100: Cylindrically-shaped display control apparatus
101: Base

102: Emitting section
103: Reflecting mirror
104: Optical axis
110: Sensor section
120: Control section
121: Indicator body recognition section
122: Operating line creation section
123: Operating position recognition section
124: Display control section
130: Display section
140: Sound output section
150: Storage section
200: Display control apparatus
210: Wearing unit
220: Display section

The invention claimed is:

1. A display control apparatus, comprising:
a processor configured to:
control display of a plurality of operating lines, wherein each operating line of the plurality of operating lines corresponds to an indicator body of a user;
determine whether or not a length of a shortest line segment connecting a first operating line of the plurality of operating lines and a second operating line of the plurality of operating lines is equal to or less than a threshold value;
recognize an operating position on an object based on the determination that the length of the shortest line segment is equal to or less than the threshold value; and
control an operation on the object in a position corresponding to the recognized operating position.

2. The display control apparatus according to claim 1, wherein the processor is further configured to control display of the first operating line on an extended line from the indicator body.

3. The display control apparatus according to claim 2, wherein
a plurality of extended lines extends from a plurality of indicator bodies in a direction in which the plurality of indicator bodies is extended,
the plurality of extended lines includes the extended line, and
the plurality of indicator bodies includes the indicator body.

4. The display control apparatus according to claim 3, further comprising a display screen configured to present the user with a display region to display the object three-dimensionally.

5. The display control apparatus according to claim 4, wherein the processor is further configured to control the display screen such that portions of the plurality of extended lines stretching into the display region are displayed as the plurality of operating lines.

6. The display control apparatus according to claim 1, wherein the processor is further configured to determine a midpoint of the shortest line segment as the operating position.

7. The display control apparatus according to claim 1, wherein the processor is further configured to determine, as the operating position, a partial region on a plane defined by the first operating line and by the second operating line.

8. The display control apparatus according to claim 1, wherein
the processor is further configured to present the user with the recognized operating position, and the presentation is based on at least one of a display mode feature change, an audio notification, or a vibration notification.

9. The display control apparatus according to claim 1, wherein the processor is further configured to control the operation on the object in a case where the operating position either comes into contact with or enters the object.

10. A display apparatus, comprising:
a display screen configured to display a plurality of operating lines, wherein
each operating line of the plurality of operating lines corresponds to an indicator body of a user,
the plurality of operating lines are displayed for recognition of an operating position on an object,
the recognition of the operating position is based on whether or not a length of a shortest line segment connecting a first operating line of the plurality of operating lines and a second operating line of the plurality of operating lines is equal to or less than a threshold value, and
the operating position corresponds to a position in which the object is operable.

11. The display apparatus according to claim 10, wherein
the display apparatus is wearable by the user,
the display screen is further configured to:
present the user with a display region to display the object three-dimensionally; and
display the plurality of operating lines superposed on a plurality of indicator bodies, and
the plurality of indicator bodies includes the indicator body.

12. A display control method, comprising:
controlling, by a processor, display of a plurality of operating lines, wherein each operating line of the plurality of operating lines corresponds to an indicator body of a user;
determining, by the processor, whether or not a length of a shortest line segment connecting a first operating line of the plurality of operating lines and a second operating line of the plurality of operating lines is equal to or less than a threshold value;
recognizing, by the processor, an operating position on an object based on the determination that the length of the shortest line segment is equal to or less than the threshold value; and
controlling, by the processor, an operation on the object in a position corresponding to the recognized operating position.

13. A non-transitory computer-readable medium having stored thereon, computer-executable instructions which, when executed by a computer, cause the computer to execute operations, the operations comprising:
controlling display of a plurality of operating lines, wherein each operating line of the plurality of operating lines corresponds to an indicator body of a user;
determining whether or not a length of a shortest line segment connecting a first operating line of the plurality of operating lines and a second operating line of the plurality of operating lines is equal to or less than a threshold value;
recognizing an operating position on an object based on the determination that the length of the shortest line segment is equal to or less than the threshold value; and
controlling an operation on the object in a position corresponding to the recognized operating position.

* * * * *